(12) United States Patent  
Morimoto

(10) Patent No.: US 9,086,228 B2  
(45) Date of Patent: Jul. 21, 2015

(54) PHOTOVOLTAIC POWER GENERATION SYSTEM AND PHOTOVOLTAIC POWER GENERATION SYSTEM CONTROL METHOD

(75) Inventor: Keiji Morimoto, Nara (JP)

(73) Assignee: SHARP KABUSHIKI KAISHA, Osaka-shi, Osaka (JP)

( * ) Notice: Subject to any disclaimer, the term of this patent is extended or adjusted under 35 U.S.C. 154(b) by 536 days.

(21) Appl. No.: 13/618,863

(22) Filed: Sep. 14, 2012

(65) Prior Publication Data

US 2013/0009486 A1 Jan. 10, 2013

Related U.S. Application Data

(62) Division of application No. 12/298,233, filed as application No. PCT/JP2007/058741 on Apr. 23, 2007, now Pat. No. 8,288,644.

(30) Foreign Application Priority Data

Apr. 24, 2006 (JP) ................................. 2006-119454

(51) Int. Cl.
```
G01R 31/26      (2014.01)
F24J 2/38       (2014.01)
H01L 31/042     (2014.01)
F24J 2/52       (2006.01)
F24J 2/54       (2006.01)
```

(52) U.S. Cl.
CPC . *F24J 2/38* (2013.01); *H02S 20/00* (2013.01); *F24J 2/523* (2013.01); *F24J 2/542* (2013.01); *Y02E 10/47* (2013.01); *Y02E 10/50* (2013.01); *Y10T 307/707* (2015.04)

(58) Field of Classification Search
CPC ................................. G01R 31/26; H02S 20/32

USPC .................. 324/761.01, 76.11; 250/200, 206; 126/600

See application file for complete search history.

(56) References Cited

U.S. PATENT DOCUMENTS 4,350,143 A * 9/1982 Laing et al. .................... 126/568  
5,529,054 A * 6/1996 Shoen ............................ 126/681

(Continued)

FOREIGN PATENT DOCUMENTS

JP 2000-196126 7/2000  
JP 2000-196127 7/2000

(Continued)

OTHER PUBLICATIONS

Makino, machine translation of JP 2000-196126, 2000, p. 1-18.*

(Continued)

*Primary Examiner* — Patrick Assouad  
*Assistant Examiner* — Lamarr Brown  
(74) *Attorney, Agent, or Firm* — Nixon & Vanderhye, P.C.

(57) ABSTRACT

A photovoltaic power generation system, wherein electrical power generated by multiple photovoltaic power generator units is gathered in a single unit group power collection control section and, in addition, supplied (transferred) to a single power converter corresponding to a single unit group power collection control section. The photovoltaic power generation system comprises generator unit groups formed by arrangement of multiple photovoltaic power generator units and unit group power collection control sections, which are connected with the photovoltaic power generator units through unit cables, and collect and control the electric power generated by the photovoltaic power generator units.

5 Claims, 20 Drawing Sheets

(56) References Cited

U.S. PATENT DOCUMENTS

| | | | |
|---|---|---|---|
| 6,018,122 A * | 1/2000 | Hibino et al. | 136/246 |
| 6,067,982 A * | 5/2000 | Harrison | 126/571 |
| 6,688,303 B2 * | 2/2004 | Davenport et al. | 126/570 |
| 7,574,942 B2 * | 8/2009 | Miyazaki | 74/500.5 |
| 7,745,723 B2 * | 6/2010 | Dyson et al. | 136/246 |
| 7,926,480 B2 * | 4/2011 | Le Lievre | 126/684 |
| 8,136,783 B2 * | 3/2012 | Pietrzak | 248/370 |
| 8,174,856 B2 * | 5/2012 | Chapman | 363/132 |
| 8,807,128 B2 * | 8/2014 | Mills et al. | 126/569 |
| 8,931,475 B2 * | 1/2015 | Gilon et al. | 126/572 |
| 2001/0034569 A1 | 10/2001 | Yamamoto et al. | 700/295 |
| 2003/0047209 A1 * | 3/2003 | Yanai et al. | 136/291 |
| 2003/0075211 A1 * | 4/2003 | Makita et al. | 136/244 |
| 2004/0187907 A1 * | 9/2004 | Morgal | 136/246 |
| 2004/0211459 A1 * | 10/2004 | Suenaga et al. | 136/244 |
| 2006/0231132 A1 * | 10/2006 | Neussner | 136/244 |
| 2007/0273210 A1 * | 11/2007 | Wang et al. | 307/45 |
| 2007/0273211 A1 * | 11/2007 | Wang et al. | 307/45 |
| 2007/0273213 A1 * | 11/2007 | Wang et al. | 307/66 |
| 2007/0273214 A1 * | 11/2007 | Wang et al. | 307/72 |
| 2007/0274113 A1 * | 11/2007 | Wang et al. | 363/109 |
| 2008/0078436 A1 * | 4/2008 | Nachamkin et al. | 136/244 |
| 2008/0091581 A1 * | 4/2008 | Kremen | 705/35 |
| 2008/0091590 A1 * | 4/2008 | Kremen | 705/38 |
| 2008/0247201 A1 * | 10/2008 | Perol | 363/73 |
| 2009/0000221 A1 * | 1/2009 | Jacobs et al. | 52/173.3 |
| 2009/0159113 A1 | 6/2009 | Morimoto | |
| 2009/0217921 A1 * | 9/2009 | Gilon et al. | 126/600 |
| 2012/0242451 A1 * | 9/2012 | Tanaka et al. | 340/3.1 |

FOREIGN PATENT DOCUMENTS

| | | |
|---|---|---|
| JP | 2001-352693 | 12/2001 |
| JP | 2002-202817 | 7/2002 |
| JP | 2004-153202 | 5/2004 |
| JP | 2005-258615 | 9/2005 |

OTHER PUBLICATIONS

International Search Report for PCT/JP2007/058741, mailed Jul. 31, 2007 (5 pages).

\* cited by examiner

PHOTOVOLTAIC POWER GENERATION SYSTEM AND PHOTOVOLTAIC POWER GENERATION SYSTEM CONTROL METHOD

This application is a divisional application of U.S. application Ser. No. 12/298,233, filed Oct. 23, 2008, which is the U.S. national phase of International Application No. PCT/JP2007/058741, filed Apr. 23, 2007, which designated the U.S. and claims priority to Japanese Application No. 2006-119454 filed Apr. 24, 2006, the entire contents of each of which are hereby incorporated by reference.

TECHNICAL FIELD

The present invention relates, at least in part, to a photovoltaic power generation system formed by arrangement of multiple photovoltaic power generator units having solar cell modules and a tracking drive section, as well as to a control method for a photovoltaic power generation system.

BACKGROUND ART

In recent years, the development of clean energy has become desirable due to global environmental concerns, such as the problems of energy resource depletion and increased $CO_2$ levels in the atmosphere, etc. In particular, photovoltaic power generation (photovoltaic power generation systems), which uses solar cells, has been developed and put to practical use as a new energy source.

For photovoltaic power generation systems, cost reduction would be desirable in terms of achieving wider adoption and a photovoltaic power generation system that improves the amount of generated electrical power and decreases the per-unit cost of the generated electrical power by comprising a tracking drive section tracking sunlight and orienting solar cell modules to the solar azimuth and elevation has been proposed as one such approach.

Moreover, concentrator-type photovoltaic power generation systems are being developed, which decrease the cost of the entire photovoltaic power generation system by reducing the use of photovoltaic cells, i.e. the most expensive component in a photovoltaic power generation system (solar cell module), by generating electricity based on tracking the Sun and collecting the incident sunlight.

In order for them to play an auxiliary role of power stations supplying electric power not only to undeveloped areas and mountainous areas, but also to urban areas, and the like, it has been proposed to use these photovoltaic power generation systems as photovoltaic power generation systems connected to power converters (power conditioners) in order to allow them to be linked to the electric power system.

As for control methods used to control the tracking drive of photovoltaic power generation systems, a method has been disclosed in Patent document 1, in which the Sun is tracked by detecting the direction of the Sun using a solar position sensor. Moreover, a method has been disclosed in Patent document 2, in which the azimuth and elevation of the Sun are calculated based on the latitude/longitude and time/date at the site where a photovoltaic power generation system is installed, and the light receiving surfaces of the solar cell modules are oriented in that direction.

Moreover, similar methods are known in case of photovoltaic power generation systems utilizing concentrator-type solar cell modules, and a method, in which the direction of the Sun is detected from the output of a photo sensor and the light receiving surfaces of the solar cell modules are oriented to the solar azimuth and elevation, has been disclosed in Patent document 3. The only difference of concentrator-type modules is that they are constructed to collect sunlight with lenses and irradiate photovoltaic cells, which reduces the angular tolerance of the tracking shift angle and requires high accuracy in solar tracking. Their basic solar tracking operation, however, is similar to non-concentrator type photovoltaic power generation systems.

Patent Document 1: JP2000-196126A.
Patent Document 2: JP2002-202817A.
Patent Document 3: JP2004-153202A.

DISCLOSURE OF INVENTION

Problem to be Solved by the Invention

It is contemplated that photovoltaic power generation systems can be deployed as facilities, in which multiple photovoltaic power generator units (whose basic configuration includes a solar cell module and tracking drive sections) are installed in vast areas for generating large amounts of electric power. However, there have been almost no proposals as to the configuration of photovoltaic power generation systems and specific photovoltaic power generation system control methods to be used in cases, in which multiple photovoltaic power generator units are installed.

When there is only one photovoltaic power generator unit installed, an energy supply facility with an energy capacity exceeding the maximum energy necessary for its operation is sufficient, but as to when multiple photovoltaic power generator units are installed, there have been no specific proposals as to how to economically collect the power (output) generated by each photovoltaic power generator unit and efficiently extract electric power.

Moreover, another problem is that although usually each photovoltaic power generator unit is driven individually while tracking the Sun, in a photovoltaic power generation system created by connecting multiple photovoltaic power generator units, when the output of an arbitrary photovoltaic power generator unit is reduced due to tracking shift and other reasons, it becomes necessary to detect the malfunctioning photovoltaic power generator unit and correct the defect.

In other words, the conventional photovoltaic power generation system is associated with control based on a single photovoltaic power generator unit, as disclosed in Patent document 1 through Patent document 3. Moreover, as far as photovoltaic power generation systems are concerned, as of now, there have been no proposals yet regarding photovoltaic power generation systems including power conditioners (power converters) in order to permit linking to electric power systems.

The present invention, at least in part, was made with account taken of such circumstances and it is an object of the invention to provide a photovoltaic power generation system and a photovoltaic power generation system control method allowing for handling photovoltaic power generator units exhibiting power generation malfunctions by detecting the power generation state of photovoltaic power generator units in a photovoltaic power generation system formed by the arrangement of multiple photovoltaic power generator units constituting generator unit groups.

Moreover, it is another object of the present invention to provide a photovoltaic power generation system that offers easy interconnection to electric power systems and is safe and stable as a result of being able to readily detect power generation malfunctions in a dependable manner in real time and readily correct the power generation malfunctions, as well as a photovoltaic power generation system control method therefor.

Moreover, it is another object of the present invention to provide a photovoltaic power generation system and a photovoltaic power generation system control method allowing for handling generator unit groups exhibiting power generation malfunctions by detecting the power generation state of generator unit groups in a photovoltaic power generation system formed by the arrangement of multiple generator unit groups.

Moreover, it is yet another object of the present invention to provide a photovoltaic power generation system and a photovoltaic power generation system control method allowing for the detection of power generation malfunctions in photovoltaic power generator units by providing direct solar radiation meters in the photovoltaic power generator units constituting the generator unit groups.

Moreover, it is still another object of the present invention to provide a photovoltaic power generation system control method allowing for individual control and adjustment of the tracking drive of the photovoltaic power generator units using a terminal device controlling the unit group power collection control section by communicating with the unit group power collection control section, which collects electrical power generated by, and controls the tracking drive of, the generator unit groups.

Means for Solving Problem

The photovoltaic power generation system according to an aspect of the present invention is a photovoltaic power generation system comprising generator unit groups, which are formed by arranging multiple photovoltaic power generator units having solar cell modules and a tracking drive section imparting tracking drive to the solar cell modules, unit group power collection control sections, which collect and control the electrical power generated by the generator unit groups, and power converters, which effect the power conversion of the generated electrical power collected by the unit group power collection control section, wherein there are provided unit state detection sections detecting the power generation state of each respective photovoltaic power generator unit and the output of the unit state detection sections is supplied to the unit group power collection control section.

Because it allows for gathering unit cables running from a generator unit group in a unit group power collection control section situated in the vicinity of the generator unit group and transferring the collected generated electrical power to a power converter at once using a single cable, this configuration makes wire paths as simple and short as possible and permits easy selection of the installation position of the power converter. Moreover, since the power generation malfunctions of the photovoltaic power generator units (power generation malfunctions due to tracking malfunctions, etc.) can be readily detected, a decrease in the electrical power generated by the photovoltaic power generator units (photovoltaic power generation system) can be prevented by correcting the power generation malfunctions of the photovoltaic power generator units. Moreover, the ability to readily correct power generation malfunctions makes it possible to create a safe and stable photovoltaic power generation system allowing for easy interconnection to electric power systems.

Moreover, in the photovoltaic power generation system according to an aspect of the present invention, the unit group power collection control section is adapted to comprise a unit state detection section and control the tracking drive section.

This configuration makes it possible to control the tracking drive section by detecting the power generation state of each respective photovoltaic power generator unit using the unit group power collection control section.

Moreover, in the photovoltaic power generation system according to an aspect of the present invention, in each photovoltaic power generator unit, there is provided a distributed control section controlling the tracking drive section of each photovoltaic power generator unit, with communication with the distributed control section effected via the unit group power collection control section.

This configuration makes it possible to individually control the unit group power collection control section and distributed control section, which facilitates onsite response during repair and maintenance of photovoltaic power generator units exhibiting power generation malfunctions even after starting up the photovoltaic power generation system and makes it possible to achieve higher efficiency in maintenance operations. Moreover, as a result of being able to individually control the distributed control sections, the operation of the control system/detector system can be readily checked on a unit-by-unit basis.

Moreover, in the photovoltaic power generation system according to an aspect of the present invention, the distributed control section comprises the unit state detection section.

This configuration makes it possible to control the tracking drive section by detecting the power generation state of each respective photovoltaic power generator unit using the distributed control section.

Moreover, in the photovoltaic power generation system according to an aspect of the present invention, the unit state detection sections detect the output current of each respective photovoltaic power generator unit.

This configuration makes it possible to detect the output current for each individual photovoltaic power generator unit, as a result of which photovoltaic power generator units exhibiting power generation malfunctions can be readily identified and the power generation malfunctions can be readily corrected.

Moreover, in the photovoltaic power generation system according to an aspect of the present invention, there are multiple generator unit groups and unit group power collection control section, with a group state detection section provided for detecting the power generation state of the respective multiple generator unit groups.

Moreover, it becomes possible to detect the power generation malfunctions of the generator unit groups by comparing the power levels generated by the multiple installed generator unit groups and a decrease in the electrical power generated by the generator unit groups (photovoltaic power generation system) can be prevented by correcting the power generation malfunctions of the generator unit groups exhibiting power generation malfunctions.

Moreover, in the photovoltaic power generation system according to an aspect of the present invention, at least one of the photovoltaic power generator units constituting the generator unit groups comprises a direct solar radiation meter.

This configuration makes it possible to compare generated electrical power (reference electrical power output) computed based on the direct solar radiation quantity detected by the direct solar radiation meter and the electrical power generated by the photovoltaic power generator units and makes it possible to detect power generation malfunctions in a dependable manner.

Moreover, the photovoltaic power generation system according to an aspect of the present invention comprises a system management and control section providing integrated management and control over the multiple installed generator unit groups and unit group power collection control section, and unit discrimination signals distinguishing the photovoltaic power generator units exhibiting power generation malfunctions identified based on the power generation states detected by the unit state detection sections are transmitted via the unit group power collection control section to the system management and control section, with the system management and control section adapted to correct the tracking shift of the identified photovoltaic power generator units via the unit group power collection control section.

This configuration makes it possible to automatically correct the tracking shift of the photovoltaic power generator units and permits prevention of a decrease in the electrical power generated by the photovoltaic power generator units (photovoltaic power generation system) exhibiting a tracking shift.

Moreover, the photovoltaic power generation system control method according to an aspect of the present invention is a photovoltaic power generation system control method involving forming generator unit groups by arranging multiple photovoltaic power generator units having solar cell modules and a tracking drive section imparting tracking drive to the solar cell modules, controlling the tracking diver sections via the unit group power collection control section collecting the electrical power generated by the generator unit group, and effecting the power conversion of the generated electrical power collected by the unit group power collection control section using power converters, wherein photovoltaic power generator units exhibiting power generation malfunctions are identified based on the power generation state of each respective photovoltaic power generator unit and the power generation malfunctions of the identified photovoltaic power generator units are corrected.

Moreover, in the photovoltaic power generation system control method according to an aspect of the present invention, there are installed multiple generator unit groups and unit group power collection control sections, generator unit groups exhibiting power generation malfunctions are identified by detecting the power generation state of the respective multiple generator unit groups, and the power generation malfunctions of the identified generator unit groups are corrected via the unit group power collection control section.

Moreover, in the photovoltaic power generation system control method according to an aspect of the present invention, a direct solar radiation meter is provided in at least one of the photovoltaic power generator units situated in the generator unit groups, a reference electrical power output is computed based on the solar radiation quantity detected by the direct solar radiation meter, photovoltaic power generator units exhibiting power generation malfunctions are identified by comparing the electrical power generated by the photovoltaic power generator units with the reference electrical power output, and the power generation malfunctions of the identified photovoltaic power generator units are corrected.

Moreover, in the photovoltaic power generation system control method according to an aspect of the present invention, there is provided a system management and control section providing integrated management and control over the multiple installed generator unit groups and unit group power collection control section, and unit discrimination signals distinguishing the photovoltaic power generator units exhibiting power generation malfunctions identified based on the power generation states detected by the unit state detection sections are transmitted via the unit group power collection control section to the system management and control section, with the system management and control section being adapted to correct the tracking shift of the identified photovoltaic power generator units via the unit group power collection control section.

The above-described the photovoltaic power generation system control method is designed to produce the same action as the above-described photovoltaic power generation system.

Moreover, in the photovoltaic power generation system control method according to an aspect of the present invention, the tracking drive sections are controlled by controlling the unit group power collection control section using a terminal device capable of controlling the unit group power collection control section via communication.

As a result of permitting individual control over the tracking drive sections of the photovoltaic power generator units, this configuration makes it possible to perform individual adjustment of the tracking drive and facilitates initialization, maintenance, etc.

Effects of the Invention

In accordance with one or more aspects of the photovoltaic power generation system and photovoltaic power generation system control method of the present invention, generator unit groups, which are formed by arrangement of multiple photovoltaic power generator units and a unit group power collection control section, which collects the electrical power generated by the generator unit groups and controls the tracking drive section, are used to detect the power generation state of the photovoltaic power generator units, as a result of which a decrease in the electrical power generated by the photovoltaic power generator units (photovoltaic power generation system) can be prevented by correcting the power generation malfunctions of the photovoltaic power generator units exhibiting power generation malfunctions.

Moreover, in accordance with one or more aspects of the photovoltaic power generation system and photovoltaic power generation system control method of the present invention, power generation malfunctions can be readily detected and corrected in real time, as a result of which a photovoltaic power generation system can be produced that offers easy interconnection to electric power systems and is safe and stable.

Moreover, in accordance with one or more aspects of the photovoltaic power generation system and photovoltaic power generation system control method according to the present invention, the power generation state of the generator unit groups is detected for multiple generator unit groups and unit group power collection control sections, as a result of which it becomes possible to prevent a decrease in the electrical power generated by the generator unit groups (photovoltaic power generation system) by correcting the power generation malfunctions of the generator unit groups exhibiting power generation malfunctions.

Moreover, in accordance with one or more aspects of the photovoltaic power generation system and photovoltaic power generation system control method according to the present invention, the power generation malfunctions of the photovoltaic power generator units are detected by providing direct solar radiation meters in the photovoltaic power generator units constituting the generator unit groups, as a result of which it becomes possible to prevent a decrease in the electrical power generated by the photovoltaic power generator units (photovoltaic power generation system) by correcting the power generation malfunctions of the photovoltaic power generator unit groups exhibiting power generation malfunctions.

Moreover, in accordance with one or more aspects of the photovoltaic power generation system control method of the present invention, a terminal device is used which controls the unit group power collection control section by communicating with the unit group power collection control section, as a result of which tracking drive can be adjusted by controlling the photovoltaic power generator units separately from the generator unit groups.

Figure 1:
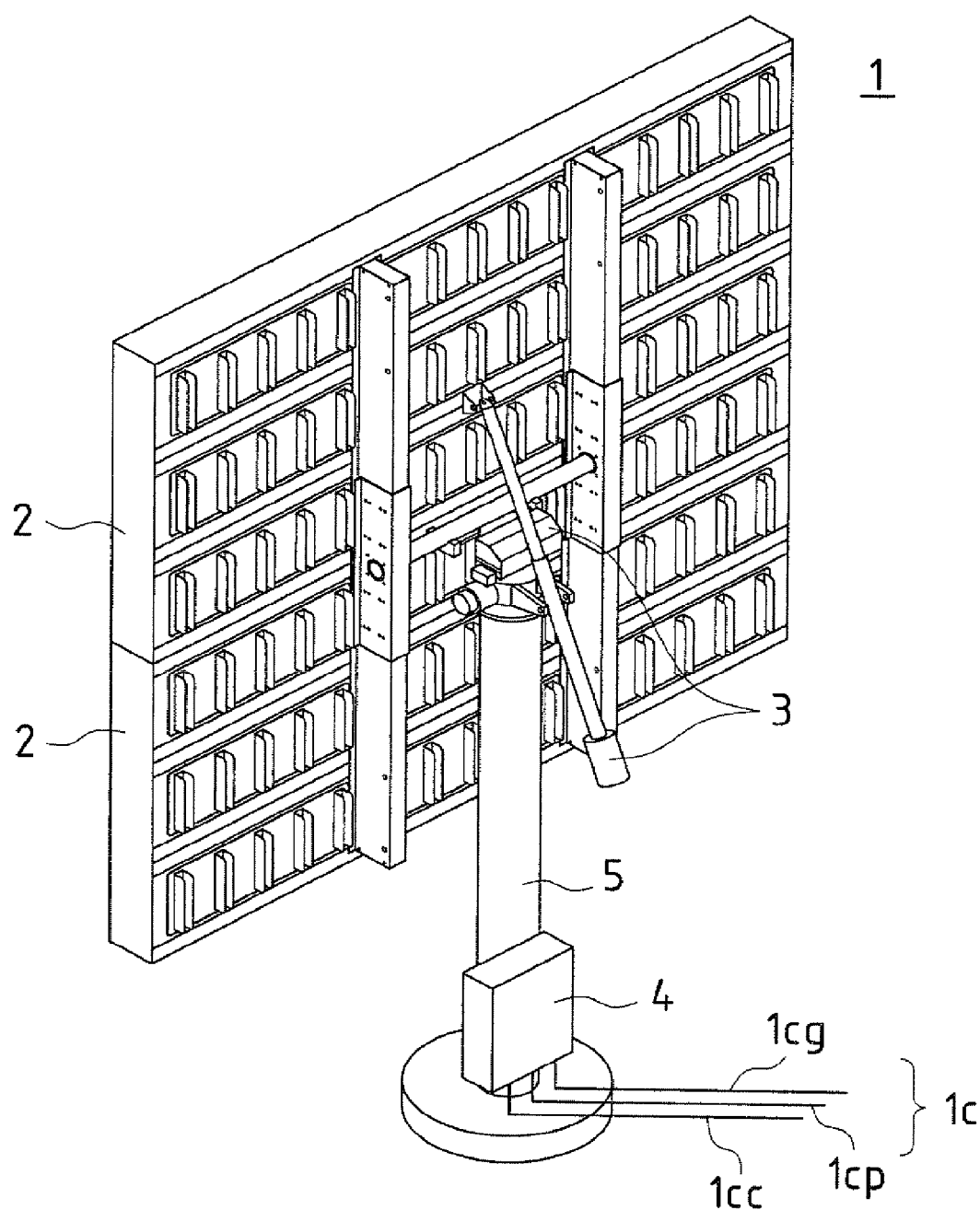
FIG. 1 is a perspective view illustrating an external appearance of a photovoltaic power generator unit used in a photovoltaic power generation system according to Embodiment 1 of the present invention.

DESCRIPTION OF REFERENCE NUMERALS 1, 101. Photovoltaic power generator units.
2. Solar cell module.
3. Tracking drive section.
4. Junction box.
1$c$, 101$c$. Unit cables.
1$cg$, 101$cg$. Power output cables.
1$cp$, 101$cp$. Power supply cables.
1$cc$. Control cable.
101$ct$. Time information system cable.
1$s$. Direct solar radiation meter.
10, 100. Photovoltaic power generation systems.
10$s$. Power management station.
10$c$. Management cable.
11, 111. Generator unit groups.
12, 112. Unit group power collection control sections.
12$c$, 112$c$. Transition cables.
13. Integrated unit group power collection control section.
13$c$. Integration cable.
15, 16. Power converters.
18. Management PC (system management and control section).
19. Management PC (system management and control section, group state detection section).
19$c$. Output detection cable.
114. Dispersion control section.
20. Notebook PC (terminal device).
30. Electric power system.
31, 131. Photovoltaic output terminal strips.
32. Control cable terminal strip.
33. Anti-backflow diode.

34. Current sensor (unit state detection section).
35. Data acquisition section.
36. Controller used for providing drive control.
37. Drive-imparting driver.
38. Line-gathering bus bar.
SQ. Solar radiation quantity.
SQd. Direct solar radiation quantity.
SQa. All-day solar radiation quantity.

BEST MODE FOR CARRYING OUT THE INVENTION

Some embodiments of the present invention are explained below with reference to drawings.
<Embodiment 1>
FIG. 1 is a perspective view illustrating an external appearance of a photovoltaic power generator unit used in a photovoltaic power generation system according to Embodiment 1 of the present invention.

The main components of a photovoltaic power generator unit 1 are solar cell modules 2 and a tracking drive section 3. In other words, the photovoltaic power generator unit 1 is designed as a tracking type solar cell module. Moreover, the solar cell modules 2 have multiple photovoltaic cells installed therein to form basic functional sections for photovoltaic power generation. FIG. 1 illustrates a state, in which the solar cell modules 2 are viewed from the back. Although the solar cell modules 2 are preferably of the concentrator type, they are not limited thereto. If they are not of the concentrator type, the only difference is that the angular tolerance of the tracking angle shift is larger while the rest of the components are the same as in the concentrator type.

The tracking drive section 3 is adapted to impart tracking drive to the solar cell modules 2 such that the direction normal to the light receiving surface of the solar cell modules 2 is parallel to sunlight. It is desirable for the tracking drive to be imparted via biaxial rotation combining azimuthal and tilting rotation.

A junction box 4 is provided on a support section 5, which holds the solar cell modules 2 and the tracking drive section 3, with a unit cable 1c connected to the junction box 4. The unit cable 1c comprises a power output cable 1cg, which transfers electric power (which is sometimes referred to simply as "power" below) generated by the solar cell modules 2, a power supply cable 1cp, which is connected to a power supply for imparting tracking drive to the tracking drive section 3, and a control system cable 1cc, which transmits and receives control system signals such as signals controlling the tracking drive section 3 and the like.

FIGS. 2 through 5 are conceptual diagrams conceptually illustrating example configurations used in a photovoltaic power generation system according to Embodiment 1 of the present invention.

Figure 2:
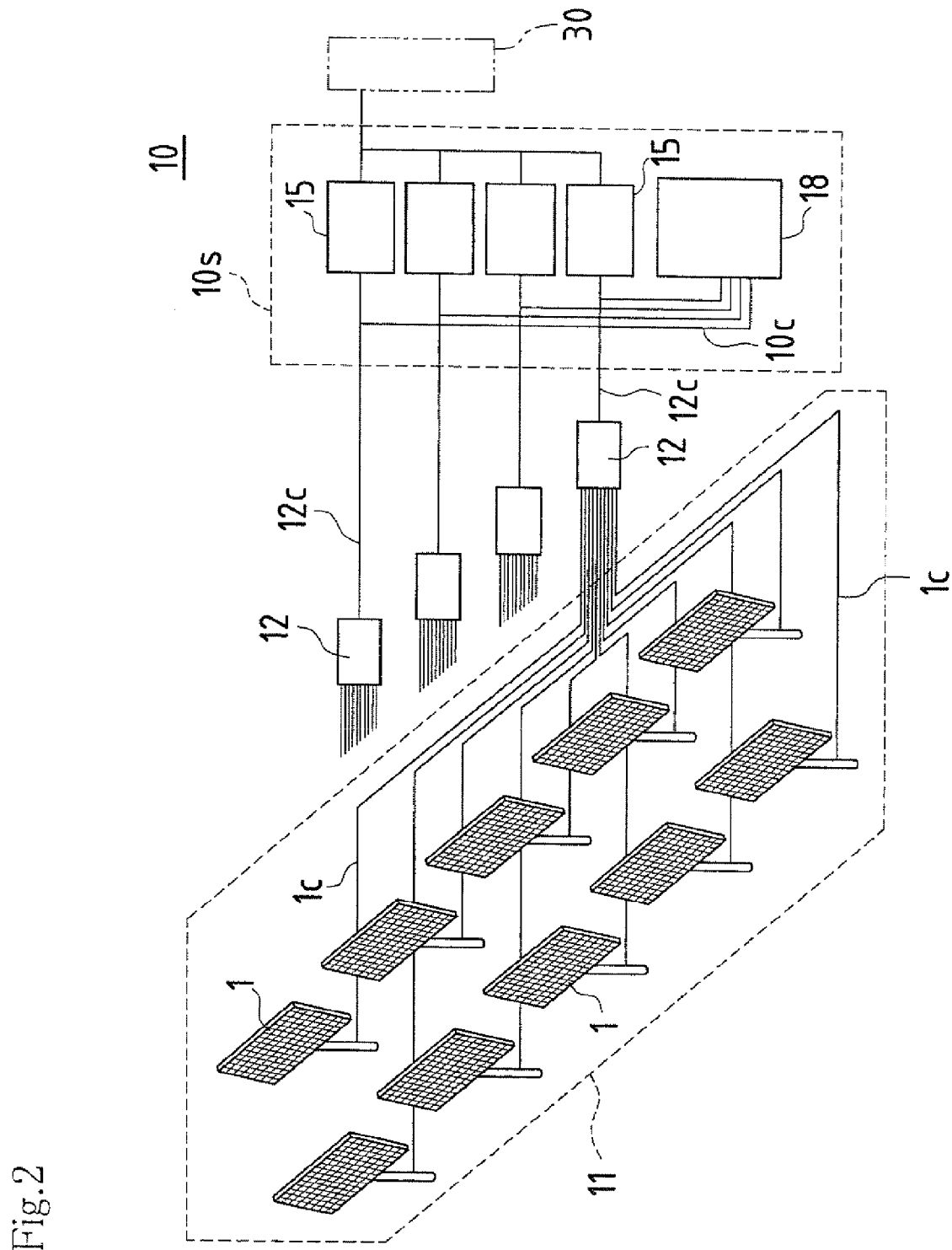
FIG. 2 is a conceptual diagram conceptually illustrating an example configuration of a photovoltaic power generation system obtained by arranging one unit group power collection control section facing one power converter.

FIG. 2 is a conceptual diagram conceptually illustrating an example configuration of a photovoltaic power generation system obtained by arranging a single unit group power collection control section facing a single power converter.

The photovoltaic power generation system 10 illustrated in FIG. 2 is adapted to gather the electrical power generated by the multiple photovoltaic power generator units 1 in a single unit group power collection control section 12 and, in addition, to supply (transfer) it to a single power converter 15 corresponding to a single unit group power collection control section 12. The photovoltaic power generation system 10 illustrated in FIG. 2 is one with the power converter 15 having a small capacity.

Figure 3:
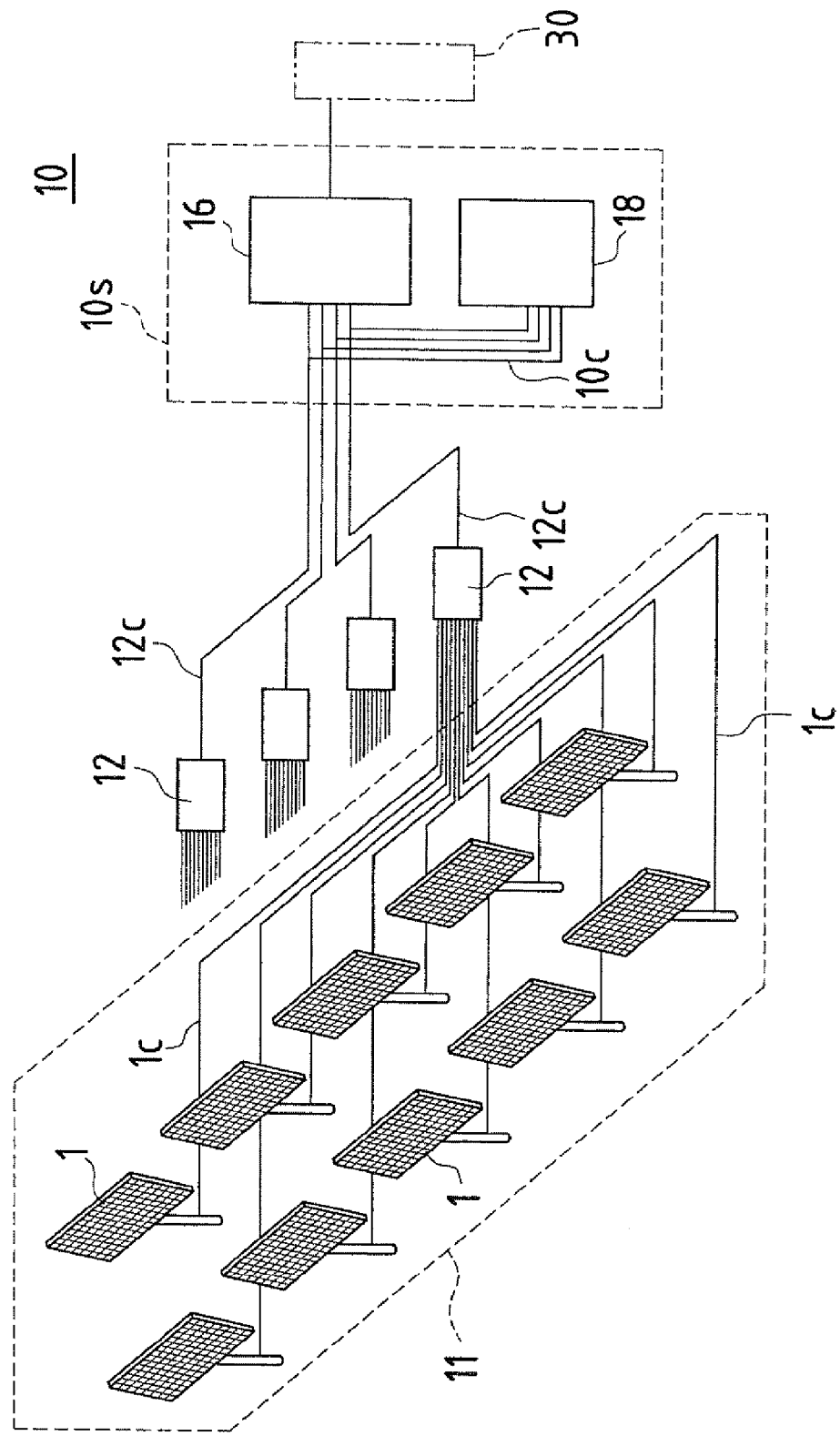
FIG. 3 is a conceptual diagram conceptually illustrating an example configuration of a photovoltaic power generation system obtained by arranging multiple unit group power collection control sections facing one power converter.

FIG. 3 is a conceptual diagram conceptually illustrating an example configuration of a photovoltaic power generation system obtained by arranging multiple unit group power collection control sections facing one power converter.

The photovoltaic power generation system 10 illustrated in FIG. 3 is adapted to gather the electrical power generated by the multiple photovoltaic power generator units 1 in a single unit group power collection control section 12 and, in addition, to supply (transfer) it to a single power converter 16 corresponding to multiple unit group power collection control sections 12. The photovoltaic power generation system 10 illustrated in FIG. 3 is one with the power converter 16 having a large capacity.

The photovoltaic power generation system 10 comprises generator unit groups 11 formed by arrangement of multiple photovoltaic power generator units 1 and unit group power collection control sections 12 which, via the unit cables 1c, are connected to the photovoltaic power generator units 1 of the generator unit groups 11, collect electrical power generated by the photovoltaic power generator units 1 situated in the generator unit groups 11 (electrical power generated by the generator unit groups 11), and control the tracking drive sections 3.

The photovoltaic power generation system 10 combines the electrical power generated by the generator unit groups 11 collected by the unit group power collection control sections 12 and transfers it to power converters 15 (power converter 16) through a conversion cable 12c, which is a single cable. The power converters 15 (power converter 16) convert the power (DC power) generated by the generator unit groups 11 into the power format (for instance, AC power) of the electric power system 30 supply it to the electric power system 30. To ensure stability and safety, the power converters 15 (power converter 16) are installed in a power management station 10s.

There are multiple generator unit groups 11 and unit group power collection control sections 12 installed, which are all centrally managed by the power management station 10s. In order to centrally manage and control the generator unit groups 11 and unit group power collection control sections 12, a management personal computer 18 (hereinafter referred to as the management PC) is connected to the conversion cables 12c brought out from the unit group power collection control sections 12 via management cables 10c. The management PC 18 is located in the power management station 10s together with the power converters 15 (power converter 16).

In other words, and multiple unit group power collection control sections 12 and multiple generator unit groups 11 supplying the generated electric power (hereinafter referred to simply as "power") to the power converters 15 (power converter 16) are centrally managed and controlled by the management PC 18 serving as a system management and control section situated in the power management station 10s.

It should be noted that, as shown in FIGS. 2 to 5, the number of the installed devices forming part of the photovoltaic power generation system 10 varies depending on the capacity of the power converters 15 and 16 used in the photovoltaic power generation system 10, the control speed of the unit group power collection control sections 12, the drive speed etc. of the tracking drive sections 3 of the photovoltaic power generator units 1, etc.

Power supply to each photovoltaic power generator unit 1 from the power management station 10s is carried out via the conversion cable 12c, unit group power collection control sections 12, and unit cable 1c (power supply cable 1cp). The electrical power generated by each photovoltaic power generator unit 1 is gathered and directed to the power converters 15 (power converter 16) located inside the power management station 10s via the unit cables 1c (power output cable 1cg), the unit group power collection control sections 12, and the conversion cables 12c.

Moreover, the transmission and reception of control system signals between the unit group power collection control sections 12 and photovoltaic power generator units 1 is carried out as described above via the control system cables 1cc. The communication system used may be any communication system, such as serial communications or parallel communications based on commonly used RS232C, RS485, or USB standards, optical communications, etc. Moreover, control system signals are superimposed on the power supply cable 1cp, which allows for concomitant use of the power supply cable 1cp as a control cable 1cc as well.

Moreover, when the unit cables 1c (conversion cables 12c) are actually connected, from the standpoint of the work process, it is preferable to place the power supply cable 1cp, power output cable 1cg, and control cable 1cc in the same wiring track in a state, in which they exert no influence on each other. It should be noted that the configuration of the cables is not limited to the example described above and can determined as the occasion demands.

The unit group power collection control sections 12 are adapted to be installed as close as possible to the photovoltaic power generator units 1. Moreover, the control system cable 1cc, power supply cable 1cp, and power output cable 1cg, which constitute the unit cable 1c connected to each photovoltaic power generator unit 11, are brought together in the unit group power collection control section 12. This configuration makes it possible to connect the unit group power collection control sections 12 and the power management station 10s, which are spaced far apart, with the help of a single conversion cable 12c, which makes it possible to simplify the wiring. Moreover, it can ensure the safety of work operations, as well as stability and reliability during maintenance.

In other words, since it readily permits orderly arrangement of the control system cables 1cc and power output cables 1cg connected to the photovoltaic power generator units 1 in a unit group power collection control section 12, allows for reducing the number of wires (number of the conversion cables 12c) leading from the unit group power collection control sections 12 to the power management station 10s to a minimum, thereby achieving a simplification of the wiring and a reduction in cost, as well as provides for supplying electrical power to the power converters 15 (power converter 16) by bringing the multiple cables (unit cables 1c) leading from the photovoltaic power generator units 1 (generator unit groups 11) together in a single conversion cable 12c, the connection between the generator unit groups 11 and power converters 15 (power converter 16) can be accomplished in a extremely orderly, clear and simple manner. Moreover, the unit group power collection control section 12 will be explained in greater detail with reference to FIG. 6.

Figure 4:
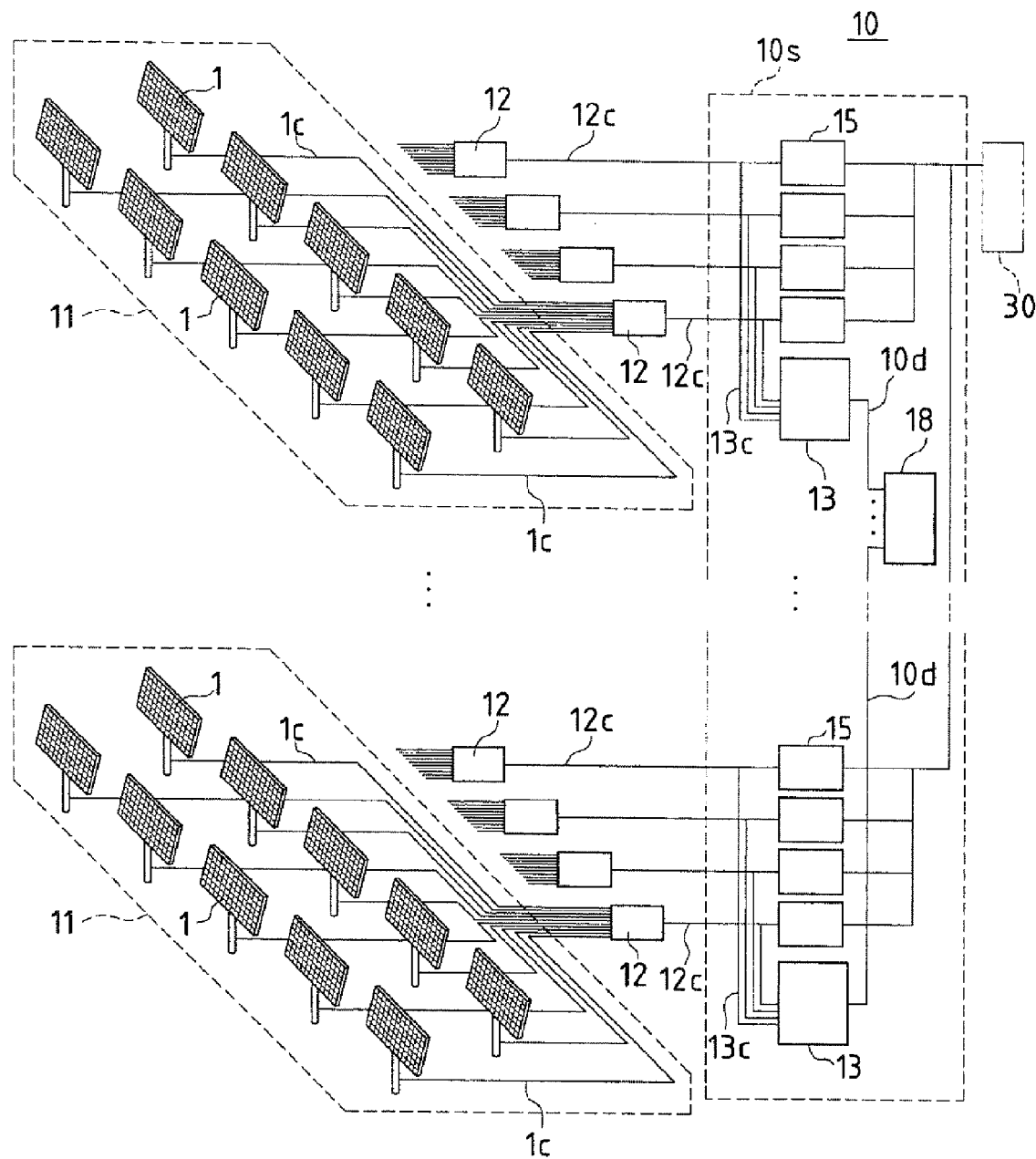
FIG. 4 is a conceptual diagram conceptually illustrating an example configuration of a photovoltaic power generation system in a situation wherein the photovoltaic power generation system shown in FIG. 2 is deployed on a large scale.
Figure 5:
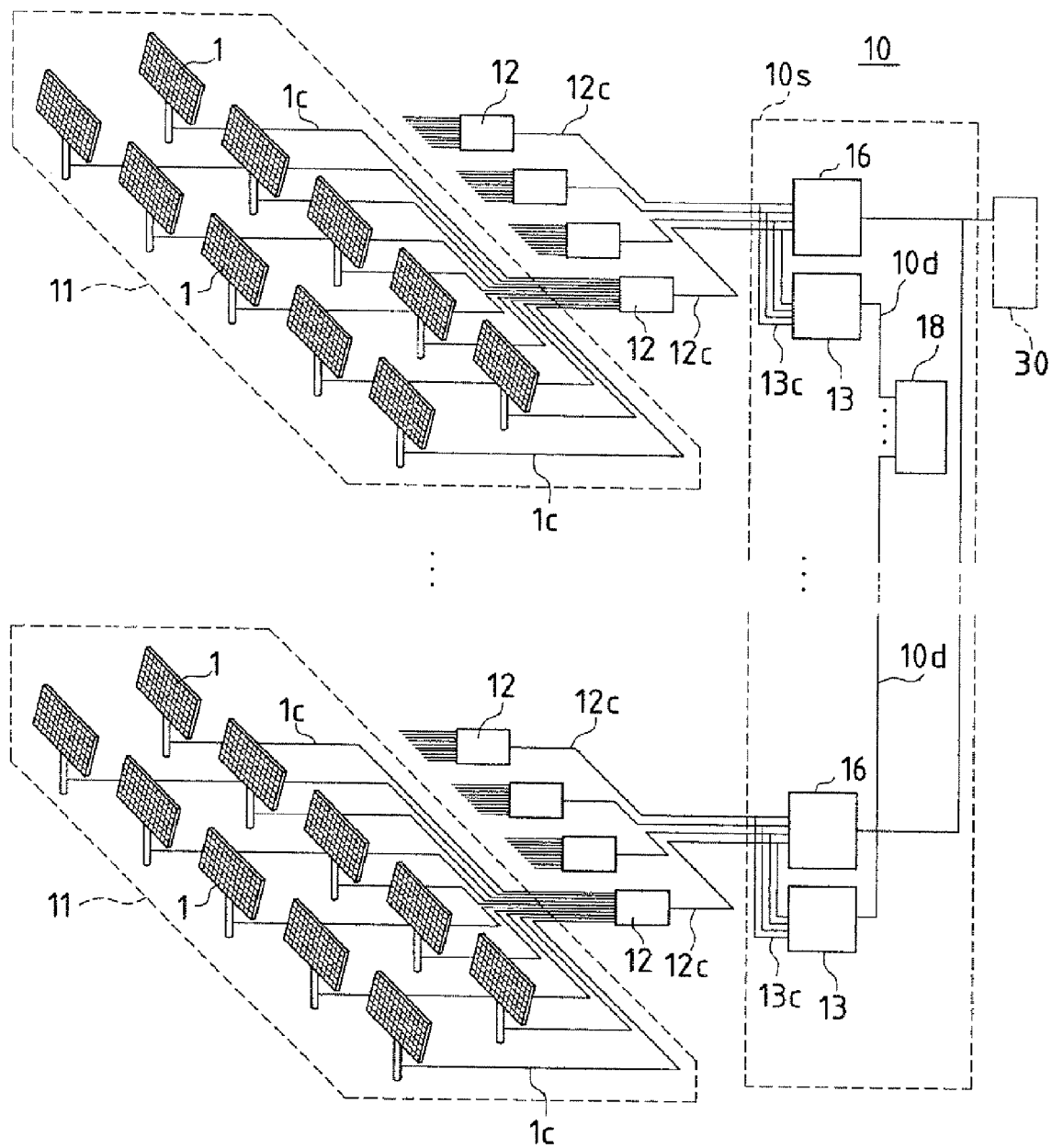
FIG. 5 is a conceptual diagram conceptually illustrating an example configuration of a photovoltaic power generation system in a situation wherein the photovoltaic power generation system shown in FIG. 3 is deployed on a large scale.

FIG. 4 is a conceptual diagram conceptually illustrating an example configuration of a photovoltaic power generation system in a situation wherein the photovoltaic power generation system shown in FIG. 2 is deployed on a large scale. FIG. 5 is a conceptual diagram conceptually illustrating an example configuration of a photovoltaic power generation system in a situation wherein the photovoltaic power generation system shown in FIG. 3 is deployed on a large scale. Because the basic configuration is similar to that of FIG. 2 and FIG. 3, explanations may be omitted as the occasion requires.

If the photovoltaic power generation system 10 illustrated in FIG. 2 and FIG. 3 is simply implemented on a larger scale as is, more management PCs 18 will be needed to serve as system management and control sections. However, the management PCs 18 are very expensive, which may create problems in terms cost.

Therefore, in photovoltaic power generation system 10 illustrated in FIG. 4 and FIG. 5, there is provided an integrated unit group power collection control section 13, which supervises a predetermined number of unit group power collection control sections 12 and is connected through an integrating cable 13c, with the integrated unit group power collection control section 13 connected to the PC 18 through a management cable 10d. In other words, an embodiment, in which tracking drive control calculations requiring computing power are carried out in the integrated unit group power collection control section 13 and the calculation results of the unit group power collection control sections 12 are stored, achieves a cost reduction.

Figure 6:
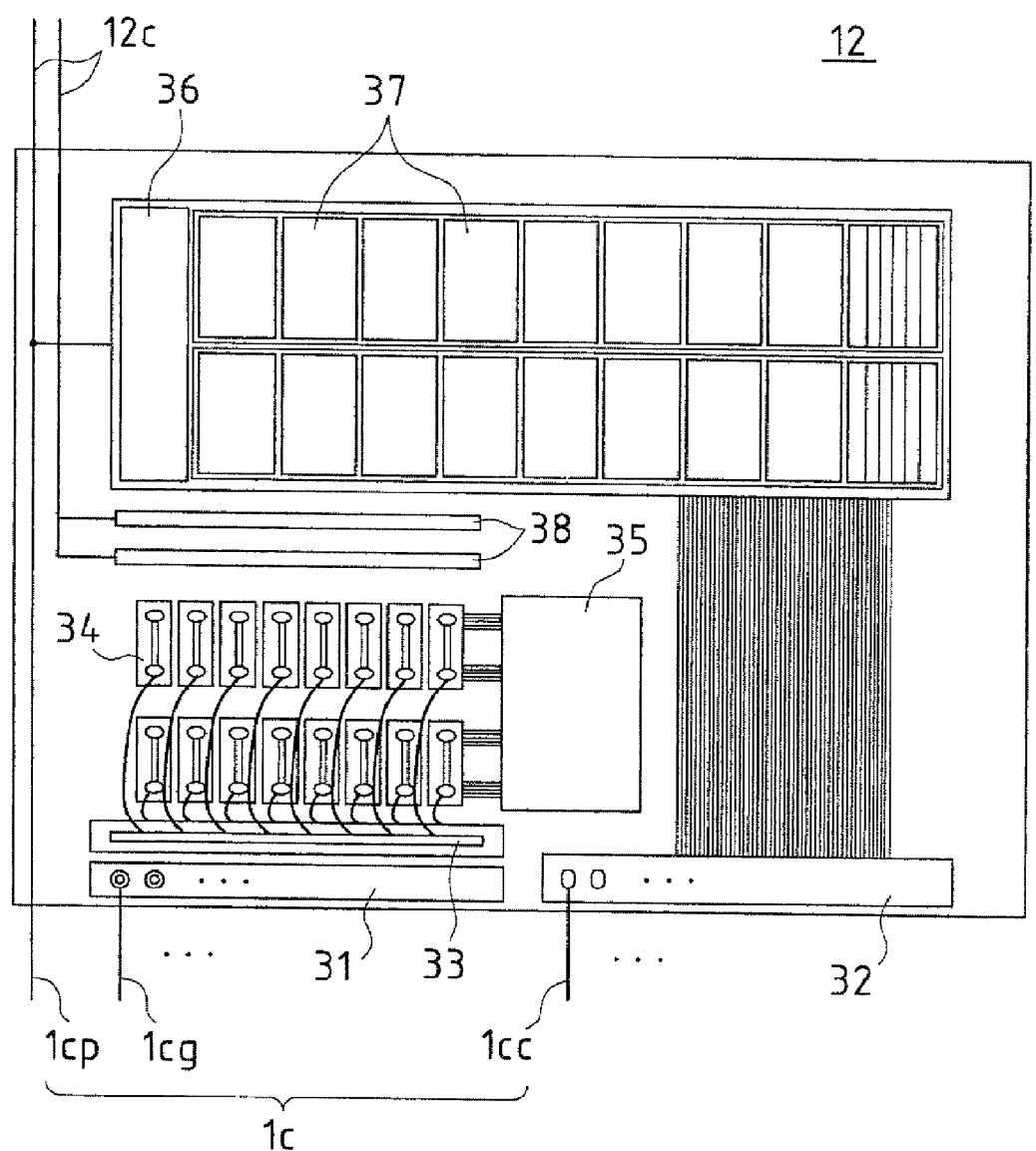
FIG. 6 is a conceptual block diagram conceptually illustrating an exemplary configuration of a unit group power collection control section used in the photovoltaic power generation system according to Embodiment 1 of the present invention.

FIG. 6 is a conceptual block diagram conceptually illustrating an exemplary configuration of a unit group power collection control section used in the photovoltaic power generation system according to Embodiment 1 of the present invention.

As a basic configuration, the unit group power collection control section 12 comprises a photovoltaic output terminal strip 31, a control cable terminal strip 32, an anti-backflow diode 33, current sensors 34, a data acquisition section 35, a controller 36 used for providing drive control, drive-imparting drivers 37, and line-gathering bus bars 38.

On the photovoltaic output terminal strip 31, power output cables 1cg routed from the photovoltaic power generator units 1 are connected to terminals assigned numbers (numbered) corresponding to the photovoltaic power generator units 1. The control system cables 1cc are connected to the control cable terminal strip 32 in accordance with numbering in the same manner as the power output cables 1cg. Moreover, to ensure the required operation, appropriate power is supplied from the power management station 10s through the conversion cables 12c. In addition, power is supplied to the photovoltaic power generator units 1 via the power supply cable 1cp.

The electric power (current) supplied to the photovoltaic output terminal strip 31 flows via the anti-backflow diode 33 to the current sensors 34, which serve as unit state detection sections detecting the state of power generation, with the output current (generated current) constantly measured in real time. In other words, the unit group power collection control section 12 is adapted to comprise unit state detection sections. It should be noted that, as far as the detection of the power generation state is concerned, the amount of generated electrical power can be detected by using other forms of sensors to measure the generated electrical power and generated voltage in addition to the output current.

Since the output current can be measured by the current sensors 34 at any time, it becomes possible to easily and precisely detect the power generation malfunctions (for instance, tracking malfunctions) of the photovoltaic power generator units 1 in real time. Moreover, output currents can be detected for each individual photovoltaic power generator unit 1, as a result of which photovoltaic power generator units 1 exhibiting power generation malfunctions can be readily identified and such power generation malfunctions can be readily corrected, which makes it possible to easily and reliably prevent a decrease in the electrical power generated by the photovoltaic power generator units 1 (photovoltaic power generation system 10).

The measured output currents are converted into data by the data acquisition section 35 and stored in the controller 36 used for providing drive control. It should be noted that the controller 36 used for providing drive control is adapted to store the output currents alongside with ID codes serving as unit discriminating signals distinguishing the photovoltaic power generator units 1. Moreover, the adjustment of the tracking drive of the tracking drive sections 3 of the photovoltaic power generator units 1 is carried out by the drive-imparting drivers 37 corresponding thereto.

Moreover, the generated electrical power supplied via the power output cables leg is collected by the line-gathering bus bars 38 and transferred to the power management station 10s via the conversion cables 12c.

<Embodiment 2>

The present embodiment relates to an exemplary process flow describing application of control to the drive of the photovoltaic power generator units 1 in the photovoltaic power generation system 10 according to Embodiment 1.

Figure 7:
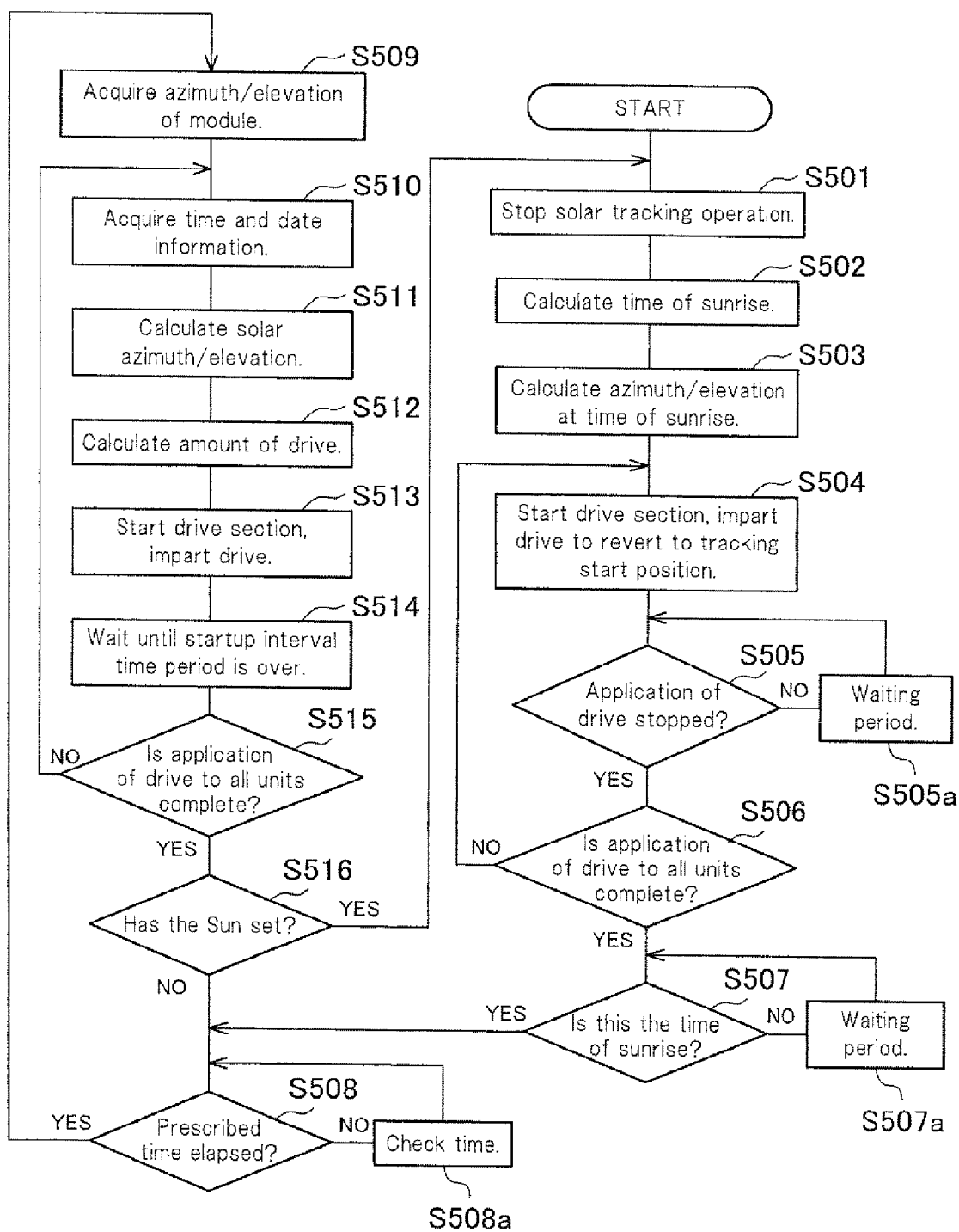
FIG. 7 is a flow chart illustrating an exemplary basic process flow of drive control in a photovoltaic power generation system (photovoltaic power generator unit) without power generation state detection.

FIG. 7 is a flow chart illustrating an exemplary basic process flow of drive control in a photovoltaic power generation system (photovoltaic power generator unit) without power generation state detection.

It should be noted that basic control over the process flow (photovoltaic power generation system control method) used herein is effected by the unit group power collection control sections 12 with respect to the photovoltaic power generator units 1 situated in the generator unit group 11. In other words, it can be carried out using software pre-installed in the unit group power collection control sections 12. Moreover, it is adapted to be suitably linked to the management PC 18 as the occasion demands.

Step S501:

After sunset, the application of drive by all the tracking drive sections 3 is stopped and the solar tracking operation of all the photovoltaic power generator units 1 is stopped.

Step S502:

The next day's sunrise time is calculated based on calendar day (date) data and the computed time of sunrise is stored.

Step S503:

The solar azimuth and elevation (tracking operation starting position) at the stored next day's sunrise time are calculated and stored.

Step S504:

The tracking drive section 3 ("drive section" in the flow chart) of one photovoltaic power generator unit 1 in the generator unit group 11 is started up and driven to revert the solar cell module 2 to the initial tracking position. In other words, the solar cell module 2 is oriented to the sunrise startup position.

Step S505:

The photovoltaic power generator unit 1 reverted in Step S504 is checked to determine whether the application of drive has stopped. If it has not stopped (Step S505: "NO"), then, after waiting for a predetermined time period (Step S505a), the program goes back to Step S505. If it has stopped (Step S505: "YES"), the program proceeds to Step S506.

Step S506:

The program checks and determines whether the application of drive to all the units (all the photovoltaic power generator units 1 situated in the generator unit group 11) is over. If it is not complete (Step S506: "NO"), the program goes back to Step S504. If it is over (Step S506: "YES"), the program proceeds to Step S507.

Step S507:

The program determines whether the time of sunrise computed in Step S502 has arrived. If the time of sunrise has not arrived (Step S507: "NO"), then, after waiting for a predetermined time period (Step S507a), the program goes back to Step S507. If the time of sunrise has arrived (Step S507: "YES"), the program proceeds to Step S508.

Step S508:

After sunrise, the program checks and determines whether a prescribed time period has elapsed. The purpose of waiting for a prescribed time period is to intermittently drive the units so as to efficiently impart tracking drive to the solar cell modules 2. If the prescribed time period has not elapsed (Step S508: "NO"), after checking the time (Step S508a), the program goes back to Step S508. If the prescribed time period has elapsed (Step S508: "YES"), the program proceeds to Step S509.

Step S509:

The program acquires the azimuth and elevation, to which all the photovoltaic power generator units 1 ("solar cell modules 2", also referred to as "modules" in the flow chart) are oriented.

Step S510:

The program acquires date information and time information.

Step S511:

Based on the acquired date information and time information, the program calculates the solar azimuth and elevation at such time.

Step S512:

The amount of drive the tracking drive section 3 needs in order to impart tracking drive to the solar cell module 2 is calculated based on the difference between the solar azimuth and elevation computed in Step S511 and the azimuth and elevation, to which the photovoltaic power generator units 1 (solar cell modules 2) are oriented, obtained in Step S509.

Step S513:

The tracking drive section 3 of the photovoltaic power generator units 1 (solar cell modules 2) is driven in accordance with the amount of drive computed in Step S512 to orient the photovoltaic power generator units 1 (solar cell modules 2) to the solar azimuth and elevation computed in Step S511.

Step S514:

In order to execute the process flow of Steps S510 through S513 at startup time (time required for driving a solar cell module 2 using the tracking drive section 3 so as to orient it to the desired solar azimuth and elevation) intervals, the program waits for a startup interval time period.

Step S515:

The program checks and determines whether the operation of starting up and imparting drive to all the units (all the photovoltaic power generator units 1 situated in the generator unit group 11) is over. If it is not complete (Step S515: "NO"), the program goes back to Step S510. If it is over (Step S515: "YES"), the program proceeds to Step S516.

Step S516:

The program checks and determines whether the Sun has set. If the Sun has not set (Step S516: "NO"), the program goes back to Step S508. If the Sun has set (Step S516: "YES"), the program goes back to Step S501.

Figure 8:
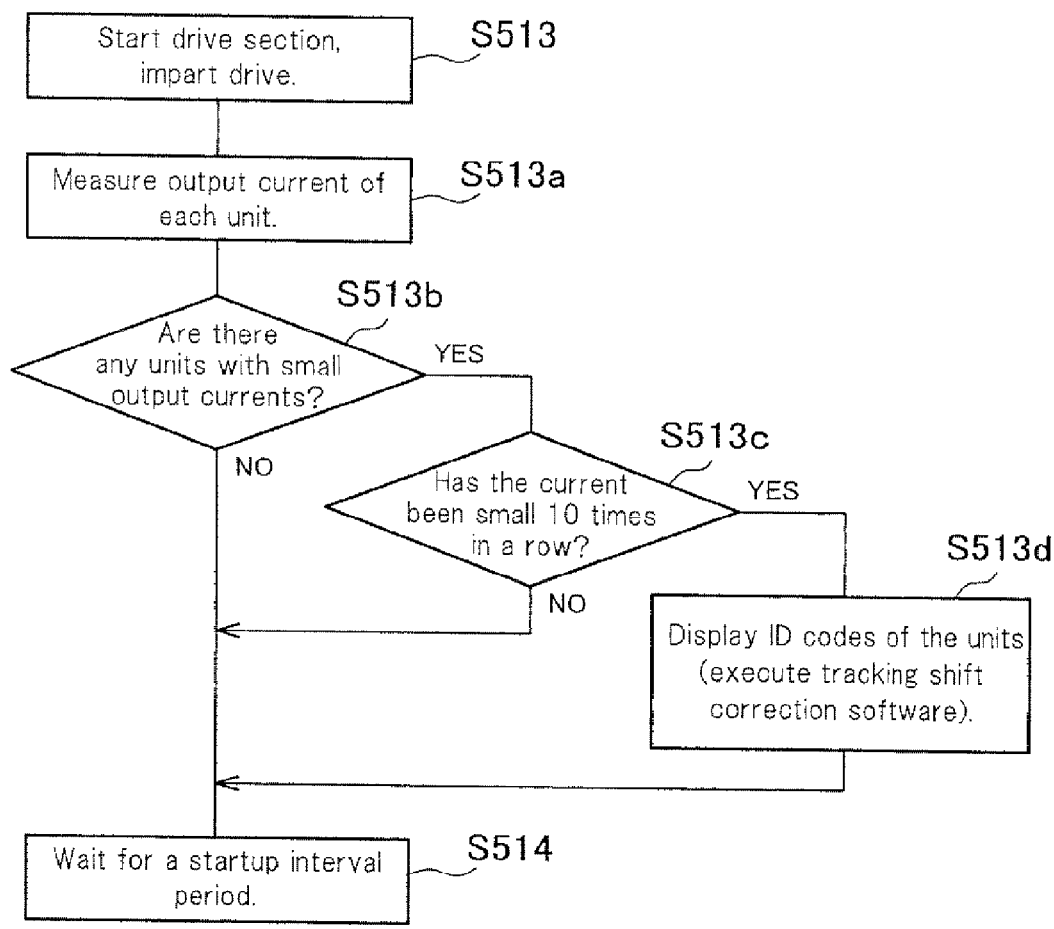
FIG. 8 is a flow chart illustrating exemplary control process flow used when the power generation state of the photovoltaic power generator units is detected by the photovoltaic power generation system according to Embodiment 2 of the present invention.

FIG. 8 is a flow chart illustrating an exemplary control process flow used when the power generation state of the photovoltaic power generator units is detected by the photovoltaic power generation system according to Embodiment 2 of the present invention.

It illustrates an example of a control process flow (photovoltaic power generation system control method) used when a subroutine for addressing power generation malfunctions by detecting the power generation state of the photovoltaic power generator units is added between the Step S513 and Step S514 in the process flow of FIG. 7, which is shown as an example of a basic process flow.

Step S513:
As explained in FIG. 7.

Step S513a:
The output currents (generated currents) of the photovoltaic power generator units 1 (called "units" in the flow chart) are measured by the current sensors 34.

Step S513b:
The program determines whether there are photovoltaic power generator units 1 whose output current is smaller in comparison with the output currents of other photovoltaic power generator units 1. If there are such units (Step S513b: "YES"), the program proceeds to Step S513c. If there are no such units (Step S513b: "NO"), the program proceeds to Step S514.

Step S513c:
The program stores ID codes (unit discrimination signals) designating the photovoltaic power generator units 1, whose output current is smaller in comparison with the output currents of other photovoltaic power generator units 1. The storage of the ID codes and output current comparison results can be carried out, for instance, by the controller 36 used for providing drive control.

For instance, the controller 36 used for providing drive control determines whether the output current of a photovoltaic power generator unit 1, whose output current is considered small, has been determined to be small, for instance, 10 times in a row. If the output current has been small 10 times in a row (Step S513c: "YES"), the program proceeds to Step S513d. If there have been fewer than 10 small output currents in a row (Step S513c: "NO"), the program proceeds to Step S514.

Step S513d:
If it is determined that the same photovoltaic power generator unit 1 has had a small output current ten times in a row, it is identified as a unit exhibiting power generation malfunctions, such as, for example, a tracking shift, etc., which is communicated to the power management station 10s (management PC 18: system management and control section). The notification can be carried out in a form permitting, for instance, suitable display of the ID codes of the photovoltaic power generator units 1 on the display of the management PC 18. Namely, in this step, the management PC 18 can recognize (identify) photovoltaic power generator units 1 exhibiting power generation malfunctions and instruct the unit group power collection control section 12 to execute a tracking correction program.

It should be noted that since immediately addressing power generation malfunctions such as tracking shifts (e.g. correcting a tracking shift) either manually or automatically is impossible, the photovoltaic power generation system 10 continues operation without interruption and proceeds to Step S514.

Moreover, the power generation malfunctions are addressed separately as the occasion demands. Namely, to address a power generation malfunction such as, for instance, a tracking malfunction, the tracking drive section 3 is directed to execute a tracking correction program that corrects tracking shifts. Accordingly, its execution allows for correcting power generation malfunctions in the photovoltaic power generator units 1.

Tracking shift correction is carried out by azimuthally and tiltingly rotating a photovoltaic power generator unit 1 (solar cell module 2) exhibiting a tracking shift about an azimuthal and tilting axis to bring it into a position, in which the output current increases. Specifically, there are cases, in which this is done manually, and cases, in which this is done automatically.

If tracking shift correction is carried out by personnel manually (using a manual tracking correction program), it can be done by cutting off the photovoltaic power generator unit 1 exhibiting a tracking shift from the photovoltaic power generation system 10 and individually subjecting it to manual control operations so as to obtain a difference between the position, in which the output current increases, and the original control position and reflect it in the initial offset values. When it is cut off, it is switched over to manual operation by transmitting a skip signal allowing the photovoltaic power generator unit 1 exhibiting a power generation malfunction to skip the basic process flow (main software program) of the photovoltaic power generation system 10 illustrated in FIG. 7. Moreover, when it is put into operation again, a return signal is transmitted that brings it back into action.

Moreover, when such tracking shift correction is carried out automatically (using automatic tracking correction software), automatic tracking correction software is incorporated into Step S513 (unit drive routine used to drive the tracking drive section 3) of the basic process flow (main program) of the photovoltaic power generation system 10 illustrated in FIG. 7 based on instructions from the management PC 18.

Namely, in Step S513, by transmitting a drive signal used for tracking correction position detection (transmitted from the unit group power collection control section 12 to the tracking drive section 3 based on instructions from the management PC 18), the amount of drive of the photovoltaic power generator unit 1 exhibiting a tracking shift is intentionally varied in the positive and negative direction to effect azimuthal rotation and tilting rotation about the azimuthal and tilting axes, changes in the output current are measured, and a position is detected, in which the output current is equivalent to that of the normal photovoltaic power generator units 1.

In the same manner as during manual correction, automatic tracking shift correction can be carried out by reflecting tracking correction signals obtained from the difference between the detected position and the original control position in initial offset values and, based on that, driving the solar cell modules 2.

It should be noted that the tracking correction program itself can use various methods and is not limited to the method described above.

Since photovoltaic power generator units 1 exhibiting power generation malfunctions are identified by detecting power generation malfunctions with the help of the unit group power collection control section 12 based on the control flow (tracking correction software) mentioned above and the output is improved by correcting the power generation malfunctions of the identified photovoltaic power generator units 1, the decrease in the electrical power generated by the photovoltaic power generation system 10 can be reduced. In particular, the photovoltaic power generation system 10 can operate more efficiently because the tracking drive section 3 can be controlled by the unit group power collection control section 12 to automatically execute tracking correction software with respect to power generation malfunctions due to tracking malfunctions.

Step S514:
As explained in FIG. 7.

Figure 9:
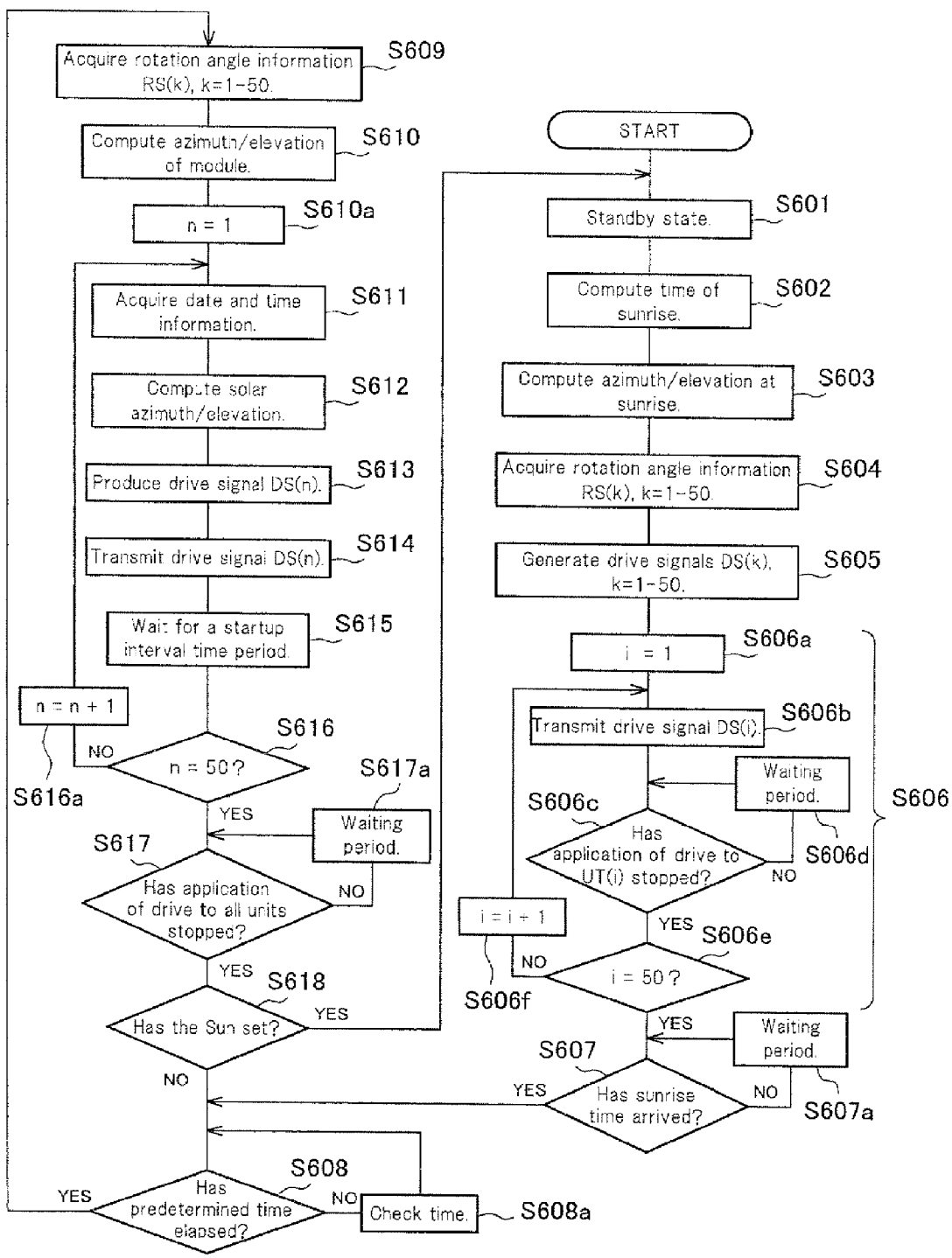
FIG. 9 is a flow chart illustrating a more specific control program example than the flow chart of FIG. 7.

FIG. 9 is a flow chart illustrating a more specific control program example than the flow chart of FIG. 7.

Let us assume that, for instance, there are 50 photovoltaic power generator units 1 and each photovoltaic power generator unit 1 is distinguished using an ID code such as UT(k)

(k=1-50), with drive signals sent to each photovoltaic power generator unit 1 designated as DS(k) and information on the rotation angle of the tracking drive section 3 designated as RS(k).

In other words, the photovoltaic power generator units 1 are designated as UT(1)-UT(50), with the drive signals correspondingly designated DS(1)-DS(50) and rotation angle information as RS(1)-RS(50). More specifically, the basic process flow (photovoltaic power generation system control method) is similar to FIG. 7, but the process flow is made more specific by specifying the number of units.

Step S601:
After sunset, all photovoltaic power generator units 1 are placed in the standby state.

Step S602:
The next day's sunrise time, at which the elevation becomes greater than 0 degrees, is computed based on calendar day (date) data and the computed time is stored.

Step S603:
The solar azimuth and elevation at the stored next day's sunrise time are computed and stored.

Step S604:
Rotation angle information RS(1)-RS(50) is acquired from the respective tracking drive sections 3 of UT(1)-UT(50).

Step S605:
The direction, in which the respective solar cell modules 2 UT(1)-UT(50) are oriented, is calculated based on the rotation angle information RS(1)-RS(50) of the tracking drive sections 3 and drive signals DS(1)-DS(50) are produced based on the difference relative to the solar azimuth and elevation of the next day's sunrise time obtained in Step S603.

Step S606a:
The k is set to k=i=1 in UT(i).

Step S606b:
A drive signal DS1 (i=1) is transmitted to UT1 (i=1) to orient the solar cell module 2 to the solar azimuth and elevation computed in Step 603 using the tracking drive section 3.

Step S606c:
The program determines whether the tracking drive section 3 of UT(1) has stopped (tracking is over). If it has not stopped (Step S606c: "NO"), then, after waiting for a predetermined time period (Step S606d), the program goes back to Step S606c. If it has stopped (Step S606c: "YES"), the program proceeds to Step S606e.

Step S606e:
The program determines whether i=50 in UT(i). If i=50 (Step S606e: "YES"), it means that all the photovoltaic power generator units 1 (UT(1)-UT(50)) have been set to initial tracking positions and the program proceeds to Step S607. If "i" has not reached 50 (Step S606e: "NO"), the program proceeds to Step S606f.

Step S606f:
The "i" is incremented: i=i+1, and the program goes back to Step S606b. As a result of this step, Steps S606b through Step S606f are repeated for all the photovoltaic power generator units 1, which makes it possible to set all the photovoltaic power generator units 1 (UT(1)-UT(50)) to the initial tracking positions using their respective tracking drive sections 3 (Step S606: Return to initial tracking position).

Step S607:
The program determines whether the time of sunrise computed in Step S602 has arrived. If the time of sunrise has not arrived (Step S607: "NO"), then, after waiting for a predetermined time period (Step S607a), the program goes back to Step S607. If the time of sunrise has arrived (Step S607: "YES"), the program proceeds to Step S608.

Step S608:
After sunrise, the program checks and determines whether a prescribed time period has elapsed. The purpose of waiting for a prescribed time period is to efficiently impart tracking drive to the solar cell modules 2 in the same manner as in Step S508. If the prescribed time period has not elapsed (Step S608: "NO"), then, after checking the time (Step S608a), the program goes back to Step S608. If the prescribed time period has elapsed (Step S608: "YES"), the program proceeds to Step S609.

Step S609:
Rotation angle information RS(k) (k=1-50) is acquired from all the photovoltaic power generator units 1 (tracking drive sections 3).

Step S610:
The azimuth and elevation, to which all the photovoltaic power generator units 1 ("solar cell modules 2", also referred to as "modules" in the flow chart) are oriented, are computed based on the rotation angle information RS(k).

Step S610a:
The k is set to k=n=1 in UT(n). It should be noted that while "i" is replaced with "n" in order to show the difference from the Steps S606a-S606f, in essence, k=i=n.

Step S611:
The program acquires date information and time information.

Step S612:
Based on the acquired date information and time information, the program computes the solar azimuth and elevation at such time.

Step S613:
The drive signals DS(n) used to drive the tracking drive sections 3 are generated based on the difference between the solar azimuth and elevation computed in Step S612 and the azimuth and elevation, to which the photovoltaic power generator units 1 (solar cell modules 2) are oriented, obtained in Step S610. It should be noted that the drive signals DS(n) include the amount of drive the tracking drive sections 3 require in order to impart tracking drive to the solar cell modules 2.

Step S614:
The drive signals DS(n) are transmitted to UT(n). Namely, drive signal DS1 (n=1) is transmitted to UT1 (n=1).

Step S615:
In order to execute the process flow of Steps S611 through S614 at startup time (time required for driving a solar cell module 2 using the tracking drive section 3 so as to orient it to the desired solar azimuth and elevation) intervals, the program waits for a startup interval time period.

Step S616:
The program determines whether n=50 in UT(n). If n=50 (Step S616: "YES"), the program proceeds to Step S617. If "n" has not reached 50 (Step S616: "NO"), the program proceeds to Step S616a.

Step S616a:
The "n" is incremented: n=n+1, and the program goes back to Step S611. As a result of this step, Steps S611 through Step S615 are repeated for all the photovoltaic power generator units 1, which makes it possible to set all the photovoltaic power generator units 1 (UT(1)-UT(50)) to the driving positions using their respective tracking drive sections 3.

Step S617:
The program checks and determines whether the application of drive to all the units (all the photovoltaic power generator units 1 situated in the generator unit group 11) has stopped. If it has not stopped (Step S617: "NO"), then, after waiting for a predetermined time period (Step S617a), the program goes back to Step S617. If it has stopped (Step S617: "YES"), the program proceeds to Step S618.

Step S618:

The program checks and determines whether the Sun has set based on the solar elevation computed in Step S612. If the Sun has not set (Step S618: "NO"), the program goes back to Step S608. If the Sun has set (Step S618: "YES"), the program goes back to Step S601. If the Sun has set, the solar tracking operation of UT(1)-UT(50) is stopped (Step S601).

Figure 10:
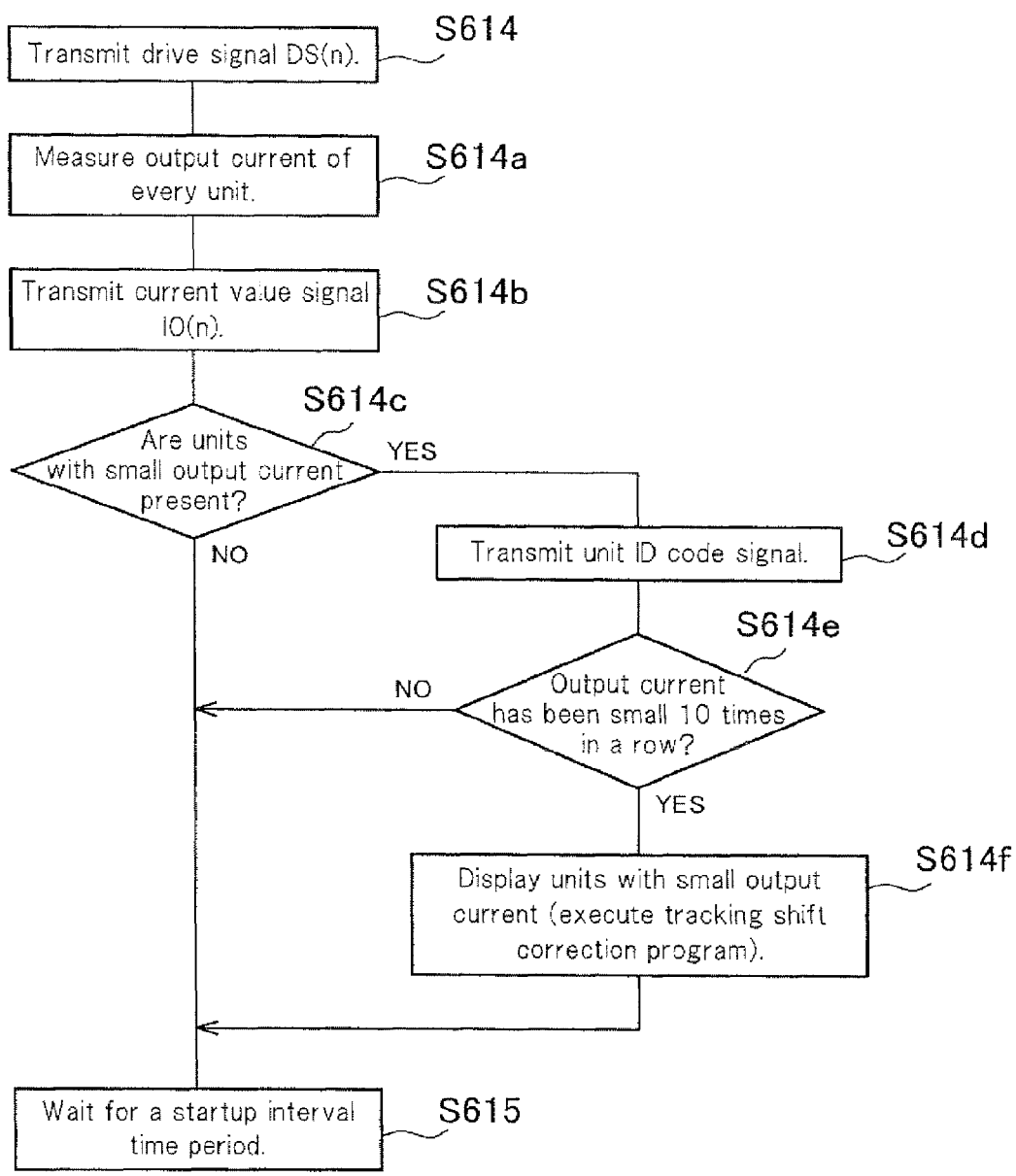
FIG. 10 is a flow chart illustrating exemplary control process flow used when the power generation state of the photovoltaic power generator units is detected by the photovoltaic power generation system according to Embodiment 2 of the present invention.

Similarly to FIG. 8, FIG. 10 is a flow chart illustrating an exemplary control process flow used when the power generation state of the photovoltaic power generator units is detected by the photovoltaic power generation system according to Embodiment 2 of the present invention. Specifically, it illustrates an example of a control process flow (photovoltaic power generation system control method) used when a subroutine for addressing power generation malfunctions by detecting the power generation state of the photovoltaic power generator units is added between the Step S614 and Step S615 in the process flow of FIG. 9.

Step S614:

As explained in FIG. 9.

Step S614a:

The output currents (generated currents) of the photovoltaic power generator units 1 (called "units" in the flow chart) are measured by the current sensors 34.

Step S614b:

A current value signal IO(n) obtained by measurements in Step S614a is transmitted from the current sensor 34 to the data acquisition section 35.

Step S614c:

The program determines whether there are photovoltaic power generator units 1 whose output current is smaller in comparison with the output currents of other photovoltaic power generator units 1. If there are such units (Step S614c: "YES"), the program proceeds to Step S614d. If there are no such units (Step S614c: "NO"), the program proceeds to Step S615.

Step S614d:

The program stores the ID codes (unit discrimination signals) of the photovoltaic power generator units 1, whose output current is smaller in comparison with the output currents of other photovoltaic power generator units 1. The storage of the ID codes and output current comparison results can be carried out, for instance, by the controller 36 used for providing drive control.

Step S614e:

For instance, the controller 36 used for providing drive control determines whether the output current of a photovoltaic power generator unit 1, whose output current is considered small, has been determined to be small, for instance, 10 times in a row. If the output current has been small 10 times in a row (Step S614e: "YES"), the program proceeds to Step S614f. If there have been fewer than 10 small output currents in a row (Step S614e: "NO"), the program proceeds to Step S615.

Step S614f:

If it is determined that the same photovoltaic power generator unit 1 has had a small output current ten times in a row, it is identified as a unit exhibiting power generation malfunctions, such as, for example, a tracking shift, etc., which is communicated to the power management station 10s (management PC 18). The notification can be carried out in a form permitting, for instance, suitable display of the ID codes of the units on the display of the management PC 18 (system management and control section). In other words, this step allows for recognizing (identifying) photovoltaic power generator units 1 exhibiting power generation malfunctions.

It should be noted that since immediately addressing power generation malfunctions such as tracking shifts (e.g. correcting a tracking shift) either manually or automatically is impossible, the photovoltaic power generation system 10 continues operation without interruption and proceeds to Step S514.

Moreover, the power generation malfunctions are addressed separately as the occasion demands. To address a power generation malfunction such as, for instance, a tracking malfunction, the tracking drive section 3 is directed to execute a tracking correction program that corrects tracking shifts. In other words, this step allows for correcting power generation malfunctions in the photovoltaic power generator units 1.

Such tracking shift correction can be carried out automatically or manually using the tracking correction program described in FIG. 8, thereby achieving the same action and effects as in case of FIG. 8.

Step S615:

As explained in FIG. 9.

As explained above, in the present embodiment, repeating a series of steps according to the process flow illustrated in FIG. 7 through FIG. 10 allows for drive control of the tracking drive sections 3 to be automatically effected so as to automatically eliminate the power generation malfunctions of all the units (UT(1)-UT(50), photovoltaic power generator units 1).

<Embodiment 3>

Figure 11:
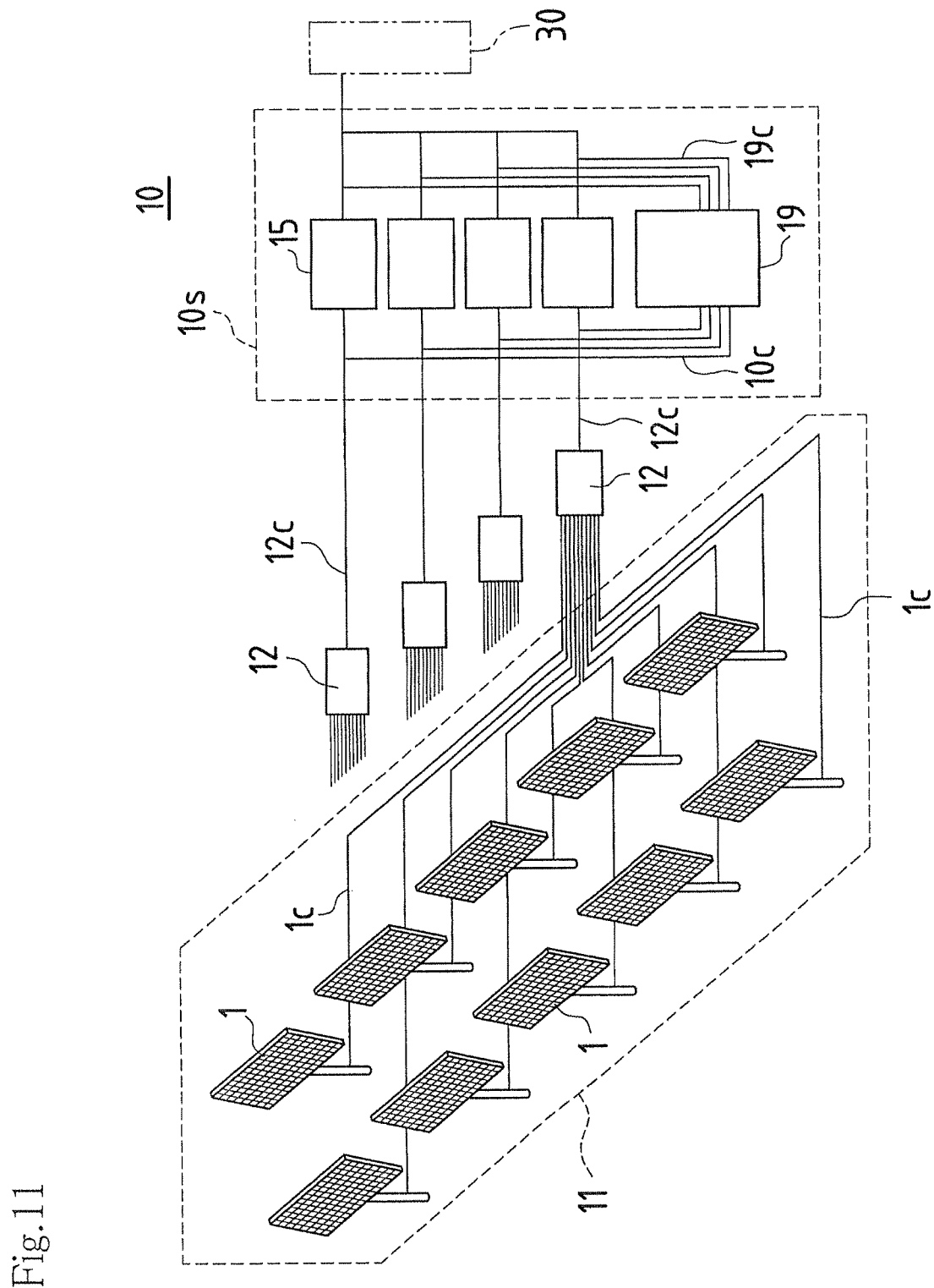
FIG. 11 is a conceptual block diagram conceptually illustrating an exemplary configuration of a photovoltaic power generation system according to Embodiment 3 of the present invention.

FIG. 11 is a conceptual block diagram conceptually illustrating an exemplary configuration of a photovoltaic power generation system according to Embodiment 3 of the present invention.

In Embodiment 1 and Embodiment 2, the generator unit groups 11 situated in the photovoltaic power generation system 10 are adapted for controlling the photovoltaic power generator units 1 using the respective corresponding unit group power collection control sections 12. In such a case, the photovoltaic power generator units 1 controlled by the unit group power collection control sections 12 are imparted tracking drive using the same control method and, as a result, the respective amounts of electrical power generated by the multiple generator unit groups 11 become substantially equal.

In other words, it may be impossible to determine the difference in generated electrical power between the generator unit groups 11 (unit group power collection sections 12) simply by comparing the output currents of the photovoltaic power generator units 1 in the same generator unit group 11.

In order to solve this problem, in the present Embodiment, a management PC 19, which serves as a group state detection section detecting the power transferred to the power converters 15 via the respective unit group power collection control sections 12 (conversion cables 12c) is located in the power management station 10s in order to detect the power generation state of the respective multiple generator unit groups 11. It should be noted that, in the same manner as the management PC 18, the management PC 19 operates as a system management and control section.

For instance, the electrical power generated by the generator unit groups 11 controlled by the unit group power collection control sections 12 constitutes the output of the power converters 15 connected to the respective generator unit groups 11. Accordingly, the output power of the power converters 15 can be detected by the management PC 19 located in the power management station 10s.

In order to allow the management PC 19 to operate as a group state detection section, the management PC 19 is adapted to detect the outputs via output detection cables 19c connected to the output side of the power converters 15. This configuration makes it possible to compare and monitor electrical power generated by the respective generator unit groups 11. It should be noted that output detection is enabled by the provision of current sensors (which may be constructed in the same manner as the current sensors 34 shown in FIG. 6) in the management PC 19. It should be also noted that detailed explanations regarding other components are omitted here because they are configured in the same manner as in FIG. 2.

Moreover, with respect to electrical power generated by the unit group power collection control sections 12, it is possible to detect the output currents of the unit group power collection control sections 12 without relying on the outputs of the power converters 15, in which case it can be determined by measuring the current values of the line-gathering bus bars 38 (see FIG. 6) and by computing the total of the currents detected by the current sensors 34 for the respective photovoltaic power generator units 1. It should be noted that when multiple conversion cables 12c are connected to a single power converter 16 (see FIG. 3, FIG. 5) in parallel, detection based on the current values (DC output currents) of the line-gathering bus bars 38 (see FIG. 6) is effective.

In accordance with the present embodiment, it becomes possible to determine the accuracy of tracking by the unit group power collection control sections 12, apply corrective action to the unit group power collection control sections 12 corresponding to the generator unit groups 11 exhibiting tracking shifts at any time, and optimize and equalize the degree of tracking accuracy for all the multiple unit group power collection control sections 12.

<Embodiment 4>

Figure 12:
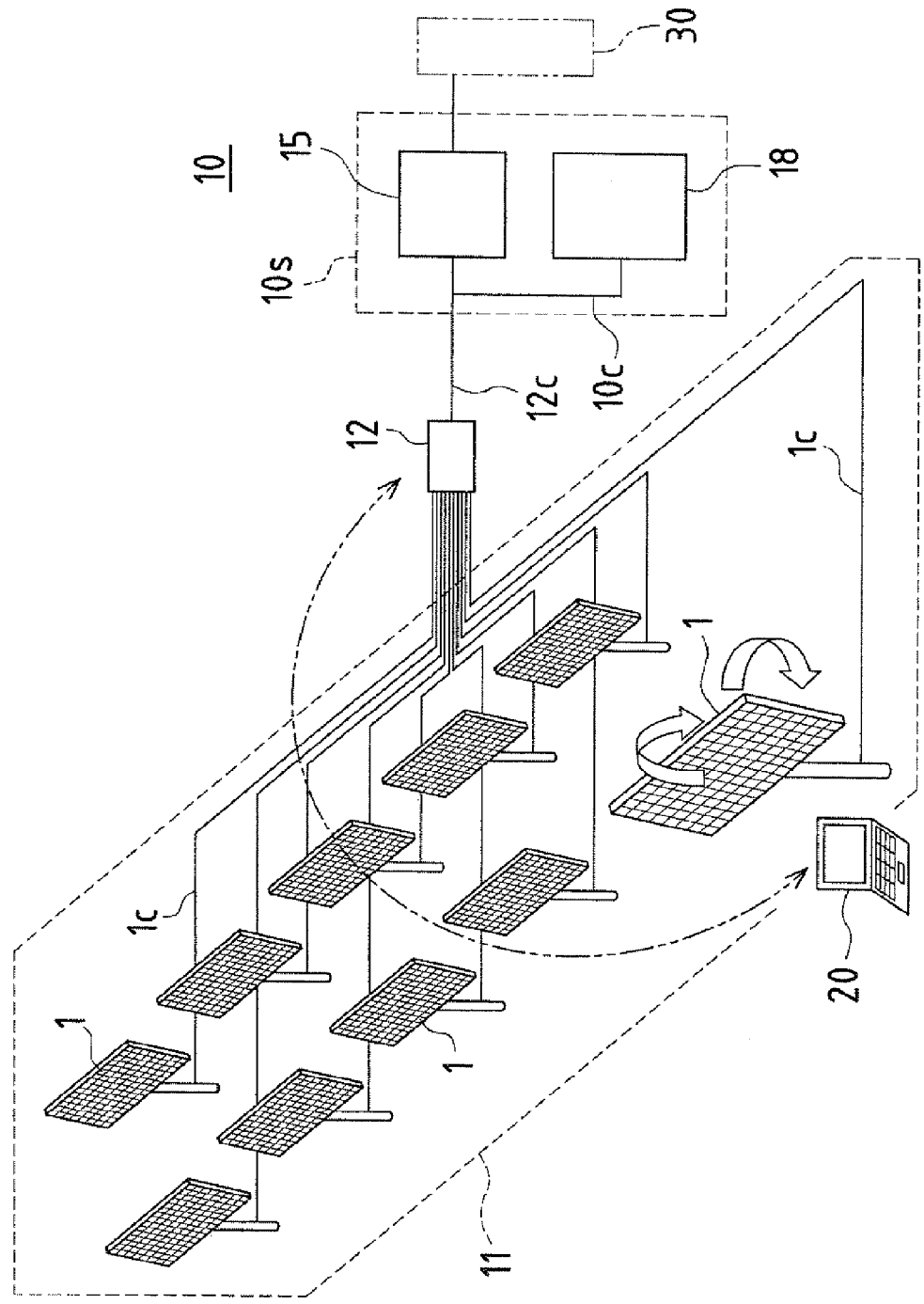
FIG. 12 is a conceptual block diagram conceptually illustrating an exemplary configuration of a photovoltaic power generation system according to Embodiment 4 of the present invention.

FIG. 12 is a conceptual block diagram conceptually illustrating an exemplary configuration of a photovoltaic power generation system according to Embodiment 4 of the present invention.

When installing the photovoltaic power generator units 1, the photovoltaic power generator units 1 are installed at the installation site in succession. When a single photovoltaic power generator unit 1 is installed, time is needed for work-related operations and a considerable amount of time is required for initialization and determination of requirements relating to the azimuth and tilt of the biaxial azimuthal/tilting rotation used for tracking drive.

Moreover, when multiple photovoltaic power generator units requiring centralized control are installed, the problem is that, as far as the determination of installation requirements and initialization of each photovoltaic power generator unit is concerned, tracking drive settings are made with the help of the unit group power collection control sections typically when the installation of all the photovoltaic power generator units is over, such that making tracking drive settings whenever a photovoltaic power generator unit is installed is difficult, and, as a result, tracking accuracy confirmation is performed primarily at the end of the installation process and it becomes difficult to obtain the required accuracy.

Accordingly, it is more efficient to complete initialization whenever a single photovoltaic power generator unit 1 is installed at the installation site than perform initialization by driving the photovoltaic power generator units 1 under the control of the power management station 10s upon installation of all the photovoltaic power generator units 1 connected to a unit group power collection control section 12.

The present embodiment makes this possible, such that, after one photovoltaic power generator unit 1 is connected to a unit group power collection control section 12 at the installation site, a notebook PC 20 serving as a terminal device is connected so as to allow wireless or wired communication with the unit group power collection control section 12. This allows for the unit group power collection control sections 12 corresponding to the photovoltaic power generator units 1 to be individually and separately controlled with the help of the notebook PC 20 by switching the tracking drive of the photovoltaic power generator units 1 from automatic to manual drive.

In other words, the solar cell modules 2 can be aligned to the current solar position so as to maximize the generated electrical power (output), as a result of which initialization can be performed easily and the efficiency and ease of installation operations can be improved, reducing the cost of installation. Moreover, the unit group power collection control sections 12 can be individually and separately controlled from the terminal device, which facilitates onsite response during repair and maintenance of photovoltaic power generator units 1 exhibiting power generation malfunctions even after starting up the photovoltaic power generation system 10 and makes it possible to achieve higher efficiency in maintenance operations.

<Embodiment 5>

Figure 13:
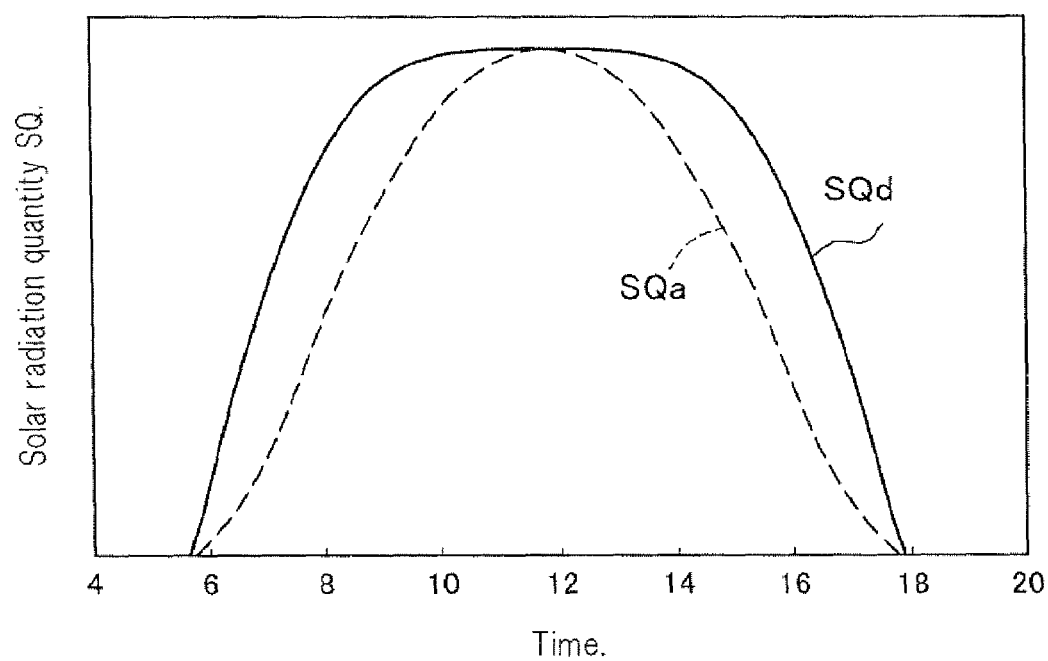
FIG. 13 is a graph illustrating an example diurnal variation in the solar radiation quantity of a fixed installation type solar cell module and the direct solar radiation quantity of a tracking type solar cell module.

FIG. 13 is a graph illustrating an example diurnal variation in the solar radiation quantity of a fixed installation type solar cell module and the direct solar radiation quantity of a tracking type solar cell module.

In the graph, time is plotted on the X-axis while the solar radiation quantity SQ is plotted on the Y-axis. A fixed installation type solar cell module is typically installed at an angle so as to face the Sun directly at noon. Accordingly, if the solar radiation quantity of a fixed installation type solar cell module (all-day solar radiation quantity SQa) and the solar radiation quantity of a tracking type solar cell module (direct solar radiation quantity SQd) are compared, one can see that the solar radiation quantity SQ is the same at noon, but the direct solar radiation quantity SQd of the tracking type solar cell module increases at other times. In other words, what determines the power generated during tracking-type solar power generation is not what is normally referred to as the solar radiation quantity SQ (all-day solar radiation quantity SQa), but the direct solar radiation quantity SQd.

Accordingly, while the electrical power generated by tracking type photovoltaic power generator units 1 constituted by tracking type solar cell modules is larger and has advantage over the electrical power generated by photovoltaic power generator units constituted by fixed installation type solar cell modules, it is impossible to understand whether electric power is generated without deficiency without determining the direct solar radiation quantity SQd.

Figure 14:
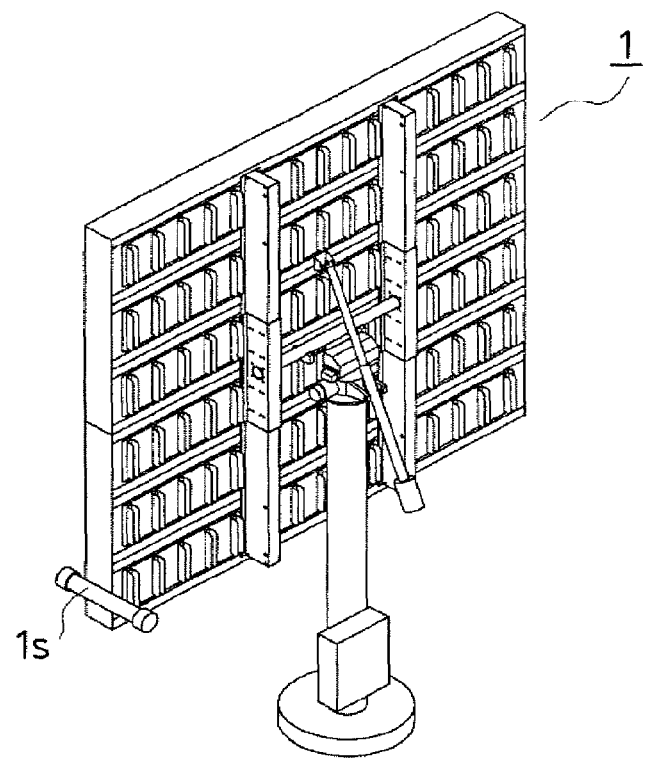
FIG. 14 is a conceptual block diagram conceptually illustrating an exemplary configuration of a photovoltaic power generation system according to Embodiment 5 of the present invention, as well as a schematic perspective view of a photovoltaic power generator unit illustrating how the direct solar radiation meter is installed.
Figure 15:
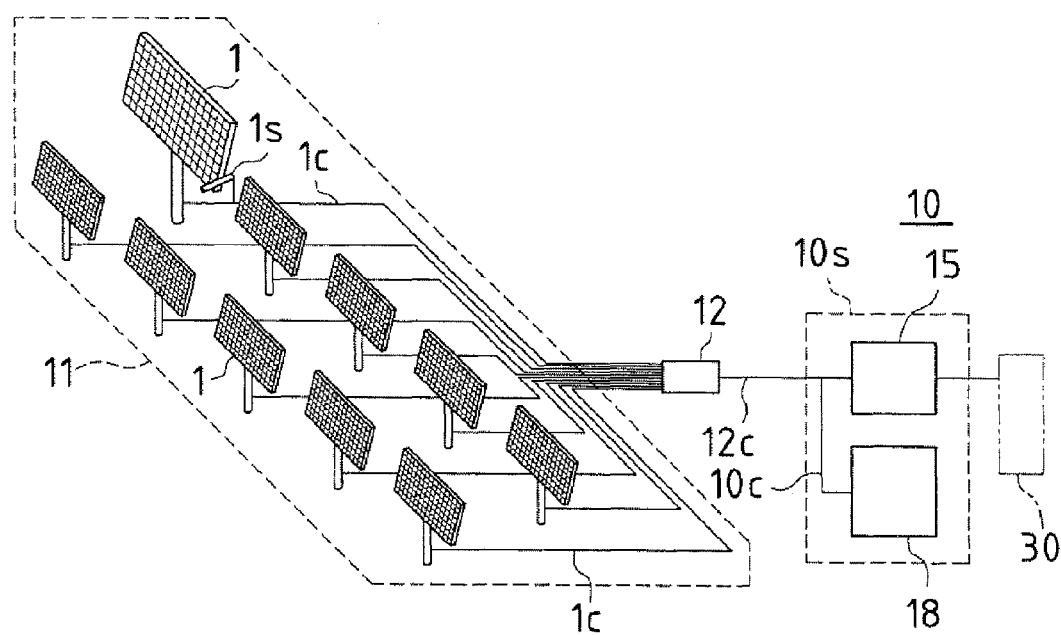
FIG. 15 is a conceptual block diagram conceptually illustrating an exemplary configuration of a photovoltaic power generation system according to Embodiment 5 of the present invention, as well as a schematic block diagram illustrating a schematic configuration of a photovoltaic power generation system.

The present embodiment, as shown in FIG. 14 and FIG. 15, is adapted to easily and reliably determine the direct solar radiation quantity SQd.

FIG. 14 is a conceptual block diagram conceptually illustrating an exemplary configuration of a photovoltaic power generation system according to Embodiment 5 of the present invention, as well as a schematic perspective view of a photovoltaic power generator unit illustrating how the direct solar radiation meter is installed. FIG. 15 is a conceptual block diagram conceptually illustrating an exemplary configuration of a photovoltaic power generation system according to Embodiment 5 of the present invention, as well as a schematic block diagram illustrating a schematic configuration of a photovoltaic power generation system.

In the present embodiment, a direct solar radiation meter is installed in at least one photovoltaic power generator unit 1 among the multiple photovoltaic power generator units 1 situated in the photovoltaic power generation system 10 (generation unit groups 11). While there is only one generator unit group 11 illustrated in the drawings, when there are multiple generator unit groups 11 installed, a direct solar radiation meter is can be installed in each one of the generator unit groups 11.

The direct solar radiation meter is installed parallel to the normal to the front face (panel surface, i.e. in a direction normal to the light receiving surface) of the solar cell module 2. Accordingly, it is possible to vary (impart tracking drive to) its direction in sync with the tracking drive of the solar cell module 2. Since the direct solar radiation meter is capable of compensating for errors of about ±5° relative to the direction of the Sun and measuring a true direct solar radiation quantity SQd, based on such compensation, it becomes possible to measure the true direct solar radiation quantity SQd even when a tracking shift occurs in a photovoltaic power generator unit 1 having such a direct solar radiation meter is installed therein.

Data on the direct solar radiation quantity SQd is sent from the direct solar radiation meter is installed in one of the photovoltaic power generator units 1 to the management PC 18 in real time over, e.g. a unit cable 1c. The theoretical value of power generated (reference power generated) in the photovoltaic power generation system 10 calculated from the direct solar radiation quantity SQd in the power management station 10s (management PC 18) is used to display the theoretical value and actual generated electrical power (electrical power generated by the photovoltaic power generator units 1) on the screen of the management PC 18 side by side. Performing the calculation of the reference generated electrical power at predetermined time intervals provides for efficient management.

The present embodiment makes it possible to readily determine the power generation efficiency of the photovoltaic power generation system 10. Moreover, it becomes possible to identify the photovoltaic power generator units 1 that exhibit low levels of generated electrical power and power generation malfunctions, thereby allowing for the power generation malfunctions of the photovoltaic power generator units 1 exhibiting such power generation malfunctions (e.g. tracking shifts) to be corrected. Furthermore, it permits detection of power generation malfunctions other than tracking shifts, such as, for instance, degradation etc. of the photovoltaic power generator units 1 (solar cell modules 2).

Accordingly, this facilitates the maintenance of the photovoltaic power generation system 10 and makes it possible to prevent a decrease in the generated electrical power.

<Embodiment 6>

Figure 16:
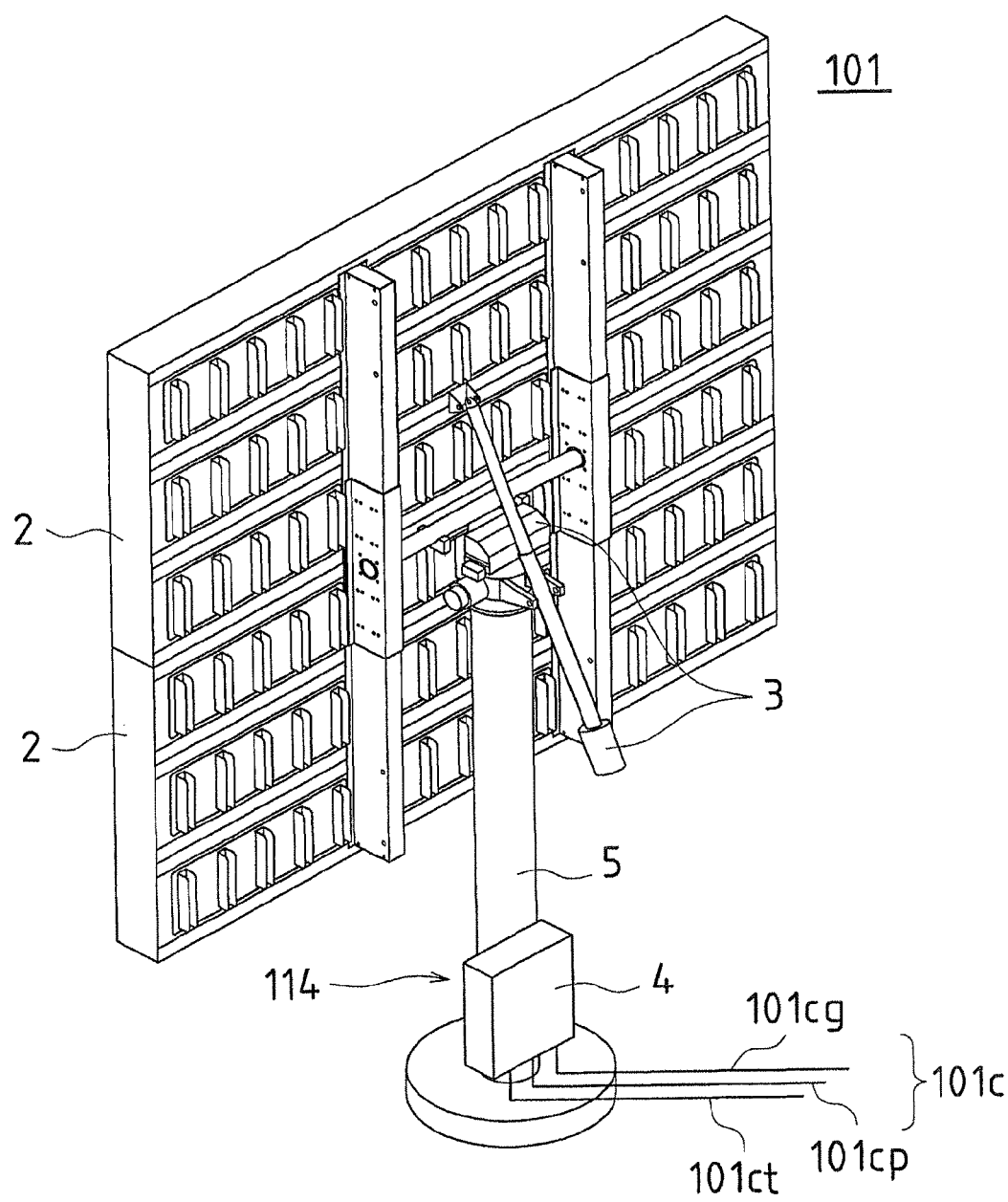
FIG. 16 is a perspective view illustrating the external appearance of a photovoltaic power generator unit used in a photovoltaic power generation system according to Embodiment 6 of the present invention.

FIG. 16 is a perspective view illustrating the external appearance of a photovoltaic power generator unit used in a photovoltaic power generation system according to Embodiment 6 of the present invention.

It should be noted that, in the explanations related to the present embodiment, elements identical to those of the above-described Embodiments 1-5 are assigned the same reference numerals.

It is a characteristic of the present embodiment that each of the photovoltaic power generator units 101 is provided with a distributed control section 114 and unit state detection sections used for power generation state detection are provided in the distributed control sections 114, with the rest of the components being identical to those of Embodiment 1. In other words, unlike Embodiment 1, in which a unit state detection section handling each of the photovoltaic power generator units 1 is provided in the unit group power collection control section 12, in the present embodiment, such unit state detection sections are provided in the distributed control sections 114.

The main components of the photovoltaic power generator unit 101 are the same as in Embodiment 1, with a unit cable 101c connected to a junction box 4 provided on a support section 5. The unit cable 101c has a power output cable 101cg, which transfers electric power generated by the solar cell modules 2, a power supply cable 101cp, which is connected to a power supply for imparting tracking drive to the tracking drive section 3, and a time information system cable 101ct, which transmits time-and-date information signals required for controlling the tracking drive section 3.

Figure 17:
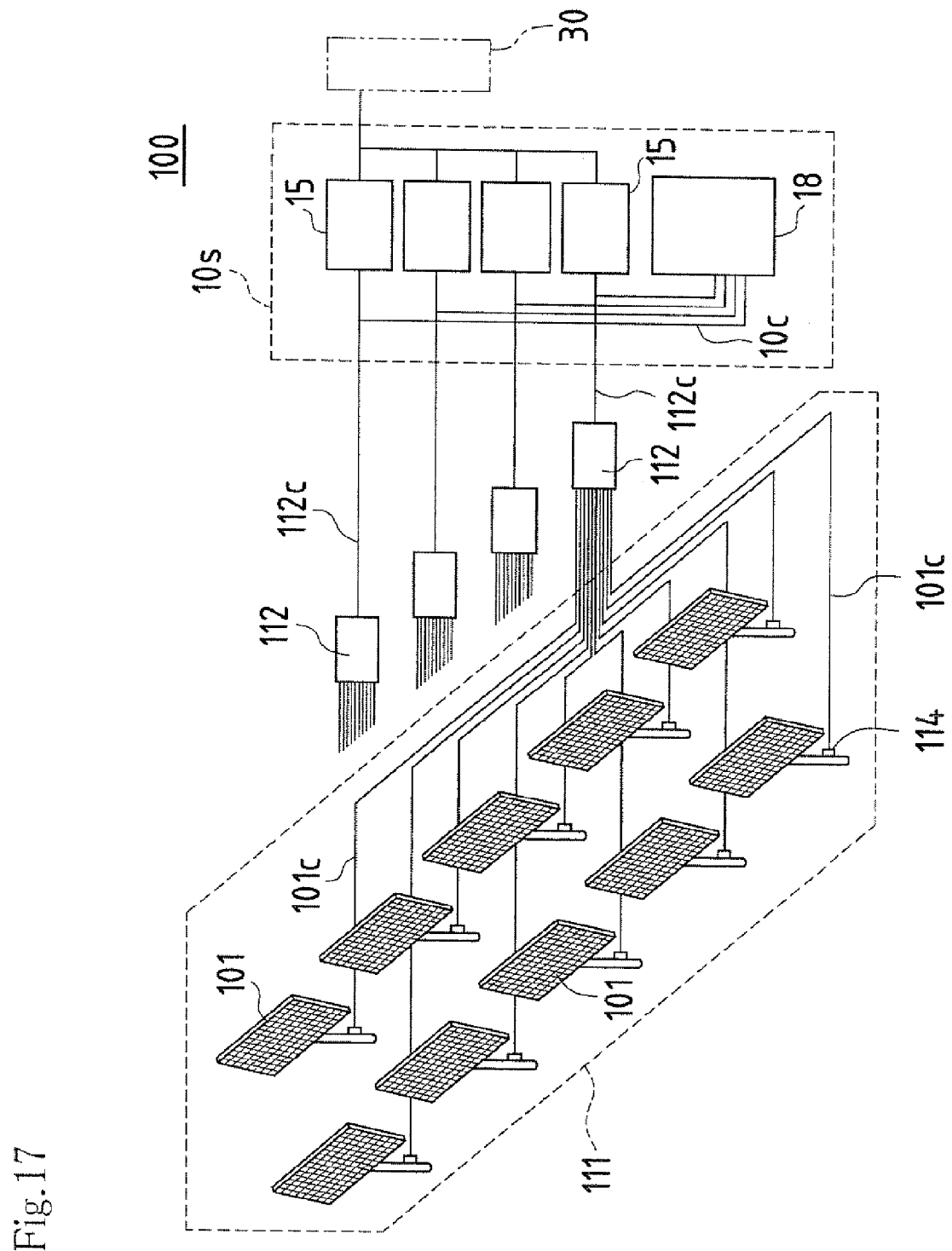
FIG. 17 is a conceptual block diagram conceptually illustrating an exemplary configuration of a photovoltaic power generation system according to Embodiment 6 of the present invention.
Figure 18:
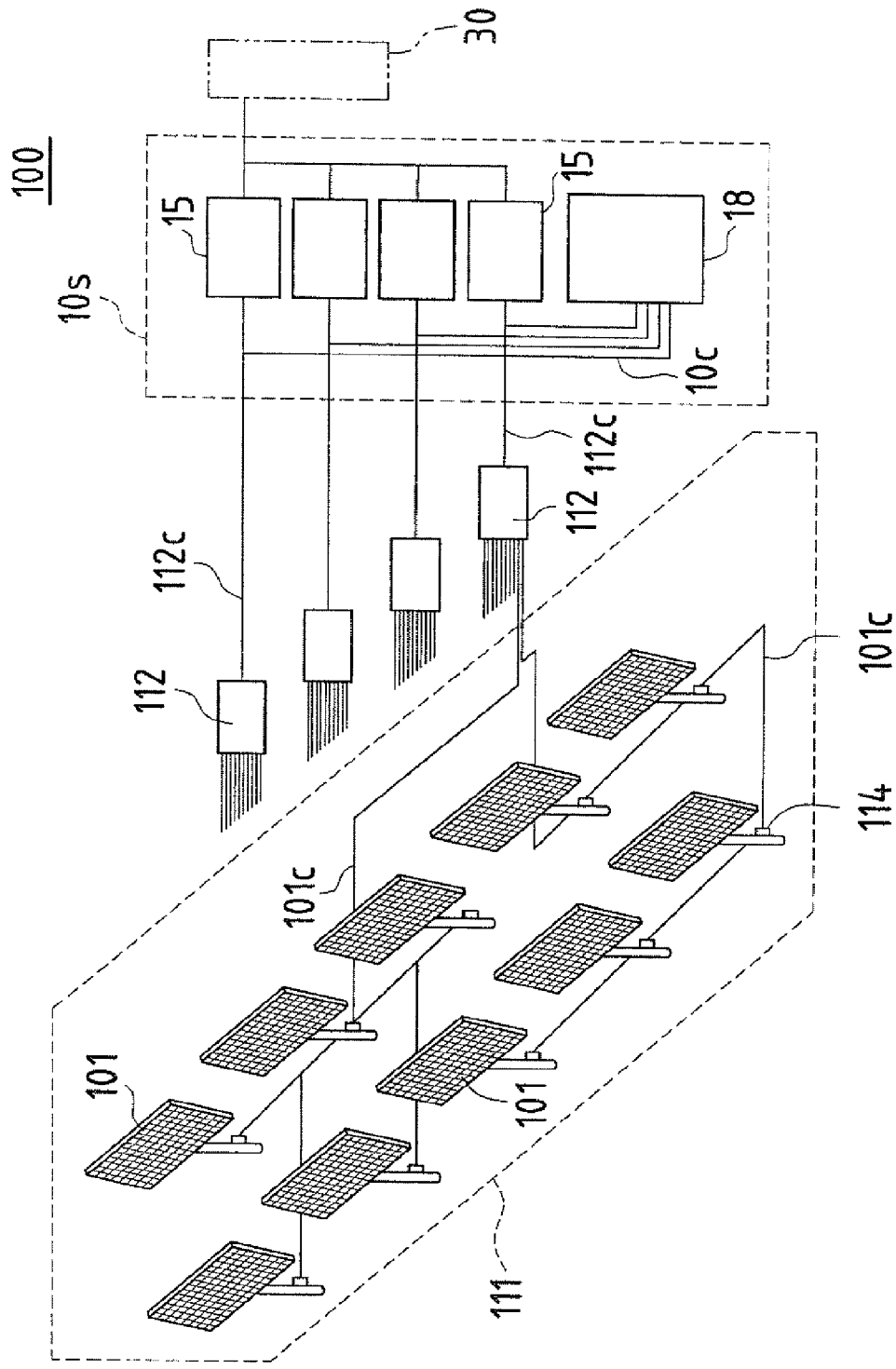
FIG. 18 is a conceptual block diagram conceptually illustrating an exemplary configuration of a photovoltaic power generation system according to Embodiment 6 of the present invention.

FIG. 17 and FIG. 18 are conceptual diagrams conceptually illustrating a photovoltaic power generation system configuration according to Embodiment 6 of the present invention.

FIG. 17 is a conceptual diagram conceptually illustrating the configuration of a photovoltaic power generation system obtained by arranging one unit group power collection control section facing one power converter. This photovoltaic power generation system 100 is different from the above-described photovoltaic power generation system illustrated in FIG. 2 in that a unit state detection section is provided in the distributed control section 114 of each photovoltaic power generator unit 101 while other components are identical to those of FIG. 2, therefore detailed description will be omitted.

FIG. 18 is a conceptual diagram conceptually illustrating a configuration used for solar power generation, in which multiple photovoltaic power generator units 101 are connected in series or in parallel via unit cables 101c through the medium of distributed control sections 114.

The photovoltaic power generation system 100 illustrated in FIG. 18 is adapted to gather the electric power generated by the multiple photovoltaic power generator units 101 in a single unit group power collection control section 112 via the respective distributed control sections 114 and, in addition, to supply (transfer) it via a single unit group power collection control section 112 to a single power converter 15 corresponding to the unit group power collection control section 112.

It should be noted that, as shown in FIG. 17 and FIG. 18, the layout of the unit cables 101c forming part of the photovoltaic power generation system 100 may be different depending on the capacity of the power converters 15 used in the photovoltaic power generation system 100, the control speed of the unit group power collection control sections 112, and the drive speed of the tracking drive sections 3 of the photovoltaic power generator units 101.

The configuration of the distributed control sections 114 illustrated in FIG. 18 has the advantage that the drive timing of the photovoltaic power generator units 101 can be shifted in an arbitrary fashion because the drive control state of adjacent photovoltaic power generator units 101 may be mutually recognized by the units.

Power is supplied to each photovoltaic power generator unit 101 from the power management station 10s via conversion cables 112c, unit group power collection control sections 112, and unit cables 101c (power supply cable 101cp). The electrical power generated by each photovoltaic power generator unit 101 is gathered and directed to the power converters 15 situated inside the power management station 10s via the unit cables 101c (power output cables lcg), the unit group power collection control sections 112, and the conversion cables 112c.

Moreover, the transmission of time information system signals from the unit group power collection control sections 112 to the photovoltaic power generator units 101 is carried out as described above via the time information system cable 101*ct*. The communication system used may be any communication system, such as serial communications or parallel communications based on commonly used RS232 C, RS485, or USB standards, optical communications, etc. Moreover, control system signals are superimposed on the power supply cable 101*cp*, which allows for concomitant use of the power supply cable 101*cp* as a time information system cable 101*ct* as well.

Moreover, when the unit cables 101*c* (conversion cables 112*c*) are actually connected, from the standpoint of the work process, it is preferable to place the power supply cable 101*cp*, power output cable 101*cg*, and time information system cable 101*ct* in the same wiring track in a state, in which they exert no influence on each other. It should be noted that the configuration of the cables is not limited to the example described above and can determined as the occasion demands.

The unit group power collection control sections 112 are adapted to be installed as close as possible to the photovoltaic power generator units 101. Moreover, the time information system cable 101*ct*, power supply cable 101*cp*, and power output cable 101*cg*, which constitute the unit cable 101*c* connected to each photovoltaic power generator unit 111, are brought together in the unit group power collection control section 112. This configuration makes it possible to connect the unit group power collection control sections 112 and the power management station 10*s*, which are spaced far apart, with the help of a single conversion cable 112*c*, which makes it possible to simplify the wiring. Moreover, it can ensure the safety of work operations, as well as stability and reliability during maintenance.

In other words, since it readily permits orderly arrangement of the time information system cables 101*ct* and power output cables 101*cg* connected to each photovoltaic power generator unit 101 in a unit group power collection control section 112, allows for reducing the number of wires (number of the conversion cables 112*c*) leading from the unit group power collection control sections 112 to the power management station 10*s* to a minimum, thereby achieving a simplification of the wiring and a reduction in cost, as well as provides for supplying electrical power to the power converters 15 by bringing the multiple cables (unit cables 101*c*) leading from the photovoltaic power generator units 101 (generator unit groups 111) together in a single conversion cable 112*c*, the connection between the generator unit groups 111 and power converters 15 can be accomplished in a extremely orderly, clear and simple manner. Moreover, the unit group power collection control section 112 will be explained in greater detail with reference to FIG. 19.

Figure 19:
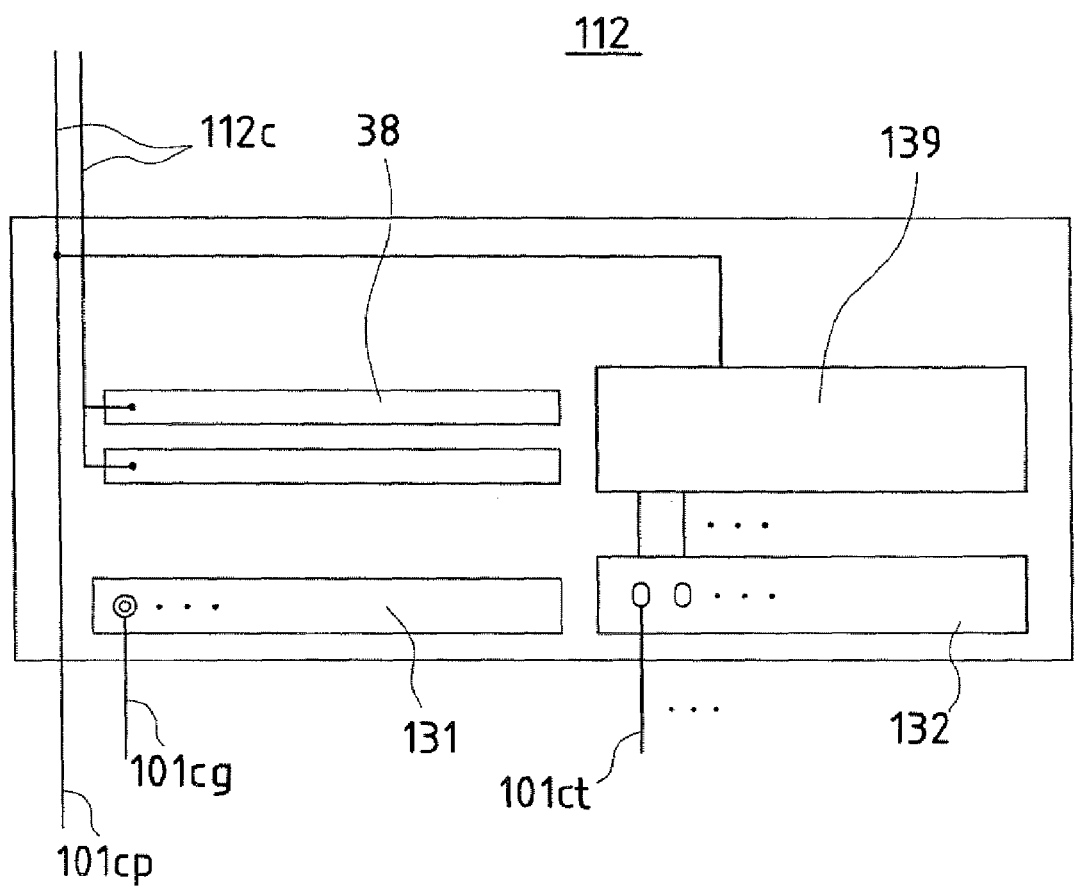
FIG. 19 is a conceptual block diagram conceptually illustrating an exemplary configuration of a unit group power collection control section used in the photovoltaic power generation system according to Embodiment 6 of the present invention.
Figure 20:
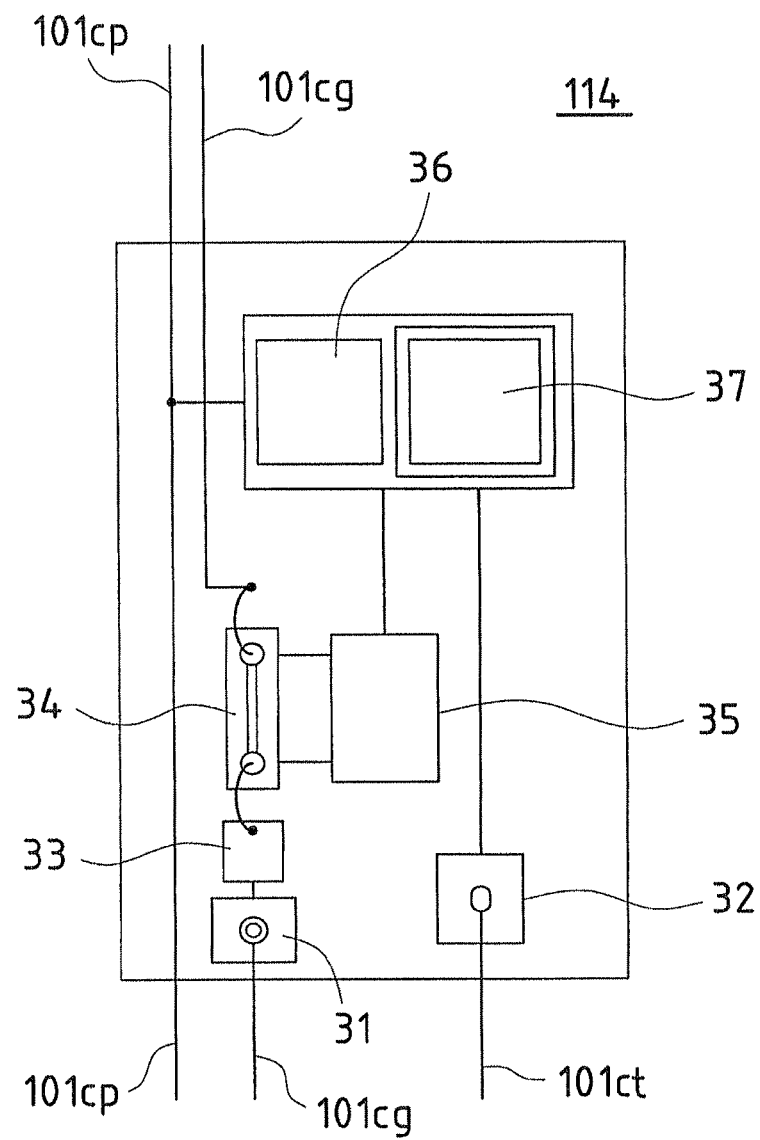
FIG. 20 is a conceptual block diagram conceptually illustrating an exemplary configuration of a distributed control section used in the photovoltaic power generation system according to Embodiment 6 of the present invention.

FIG. 19 shows an exemplary configuration of a unit group power collection control section employed in the photovoltaic power generation system according to Embodiment 6 of the present invention, and FIG. 20 is a conceptual block diagram which conceptually illustrating the configuration of an exemplary distributed control section configuration employed in the photovoltaic power generation system according to Embodiment 6 of the present invention.

As a basic configuration, the unit group power collection control section 112 comprises a photovoltaic output terminal strip 131, a time information system cable terminal strip 132, line-gathering bus bars 38, and a hub 139.

The role of the unit group power collection control section 112 in the present embodiment is to collect electrical power generated by the generator unit group 111 and control the transmission of time information to the distributed control section 114. Based on obtaining time information necessary for solar trajectory calculation in the distributed control section 114, drive command/traveling position signals are received from/transmitted to the drive system driver circuits of each unit, thereby controlling the drive system. The above-mentioned time information may be sent using a clock provided in the unit group power collection control section 112. Alternatively, time information from the power management station may be transmitted to the distributed control section through the unit group power collection control section 112. Moreover, as far as time information transmission control is concerned, transmission may be constant transmission, periodic or intermittent transmission, daytime-only transmission, or transmission conducted upon reaching a solar radiation quantity ensuring a certain level of generated power.

One of the effects of the photovoltaic power generation system of this embodiment is that the computational power required of the microcomputer can be rather small because trajectory calculations are carried out separately in each unit. Moreover, there is no decrease in generated power on a group-by-group basis when a malfunction in the control system occurs, as a result of which time information transmission can be controlled such that the cessation of drive system control is carried out on a limited unit-by-unit basis. Furthermore, since the control system and power generation state detection sections are distributed, the structure of the distributed control section can be made more compact and simple.

On the photovoltaic output terminal strip 131, power output cables 101*cg* routed from the photovoltaic power generator units 101 are connected to terminals assigned numbers (numbered) corresponding to the photovoltaic power generator units 101. The time information system cables 101*ct* are connected to the time information system cable terminal strip 132 in accordance with numbering in the same manner as the power output cables 101*cg*. Moreover, to ensure the required operation, appropriate power is supplied from the power management station 10*s* through the conversion cables 112*c*. In addition, power is supplied to the photovoltaic power generator units 101 via the power supply cable 101*cp*.

As a basic configuration, the distributed control section 114 comprises a photovoltaic output terminal strip 31, a control cable terminal strip 32, an anti-backflow diode 33, a current sensor 34, a data acquisition section 35, a controller 36 used for providing drive control, and a drive-imparting driver 37.

The electric power (current) supplied to the photovoltaic output terminal strip 31 of the distributed control section 114 flows via the anti-backflow diode 33 to the current sensor 34, which serves as unit state detection section detecting the state of power generation, with the output current (generated current) constantly measured in real time. In other words, the distributed control section 114 is adapted to comprise a unit state detection section. It should be noted that, as far as the detection of the power generation state is concerned, the amount of generated electrical power can be detected by using other forms of sensors to measure the generated electrical power and generated voltage in addition to the output current.

Since the output current can be measured by the current sensors 34 at any time, it becomes possible to easily and precisely detect the power generation malfunctions (for instance, tracking malfunctions) of the photovoltaic power generator units 101 in real time. Moreover, output currents can be detected for each individual photovoltaic power generator unit 101, as a result of which photovoltaic power generator units 101 exhibiting power generation malfunctions can be readily identified and such power generation malfunctions can be readily corrected, which makes it possible to easily and reliably prevent a decrease in the electrical power generated by the photovoltaic power generator units 101 (photovoltaic power generation system 100).

The measured output currents are converted into data by the data acquisition section 35 and stored in the controller 36 used for providing drive control. It should be noted that the controller 36 used for providing drive control is adapted to store the output currents alongside with ID codes serving as unit discriminating signals distinguishing the photovoltaic power generator units 101. Moreover, the time information signals outputted from the unit group power collection control section 112 via the time information system cable 101*ct*, are transmitted to the controller 36 used for providing drive control in the distributed control section 114. The calculation of solar trajectories is carried out in the photovoltaic power generator units 101 on a unit-by-unit basis. They are converted to control signals in the drive-imparting drivers 37. The adjustment of the tracking drive of the drive control sections 3 of the photovoltaic power generator units 101 is carried out by the drive-imparting drivers 37 corresponding thereto.

The electrical power produced by the distributed control sections 114 and outputted via the power output cables 101*cg* is collected by the line-gathering bus bars 38 through the photovoltaic output terminal strip 131 of the unit group power collection control section 112 and transferred to the power management station 10*s* through the conversion cable 112*c*.

It should be noted that it goes without saying that the configuration illustrated in FIG. 4 and FIG. 5 may be used the present embodiment as the occasion demands.

<Embodiment 7>

Figure 21:
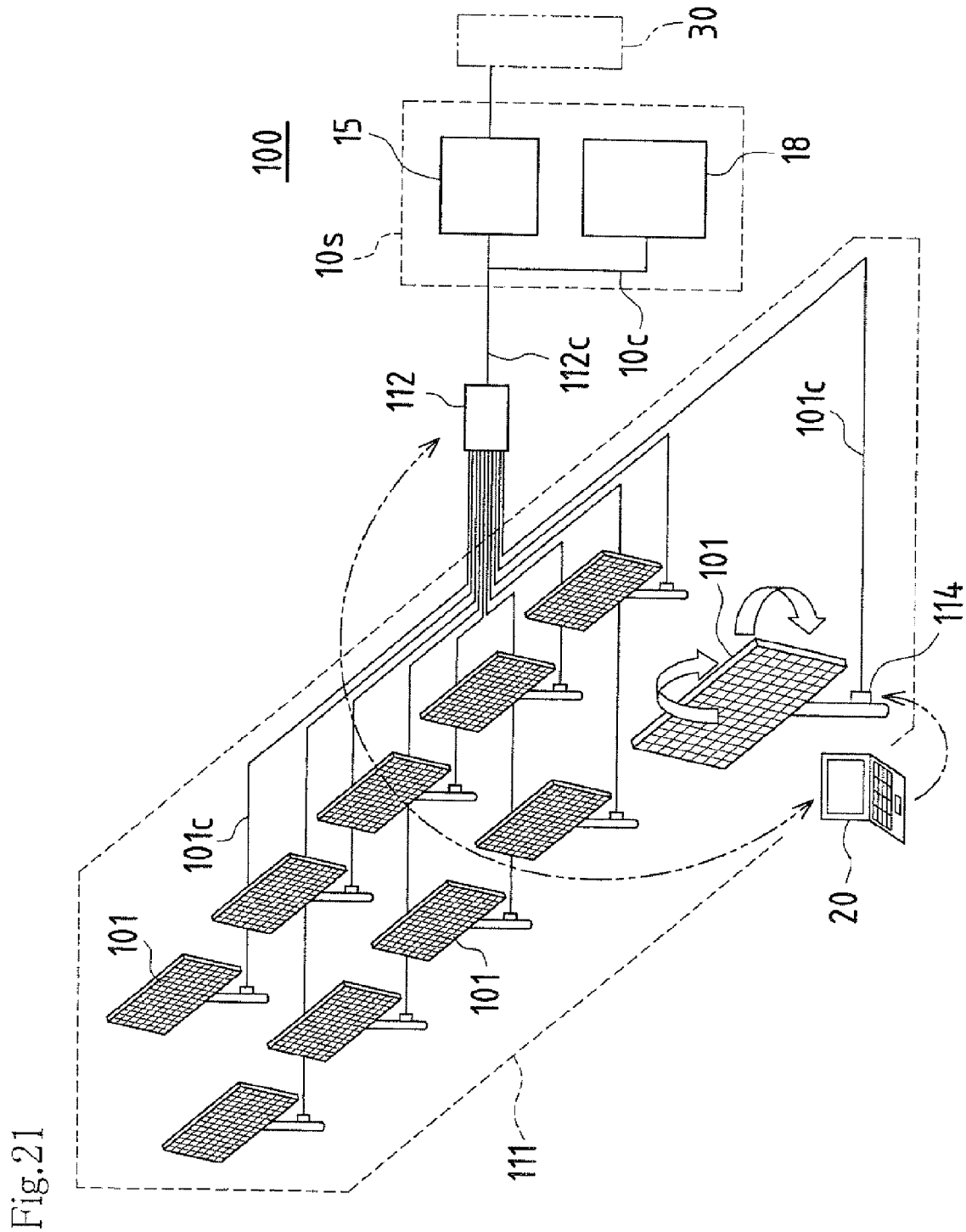
FIG. 21 is a conceptual block diagram conceptually illustrating an exemplary configuration of a photovoltaic power generation system according to Embodiment 7 of the present invention.

FIG. 21 is a conceptual block diagram conceptually illustrating an exemplary configuration of a photovoltaic power generation system according to Embodiment 7 of the present invention.

It is a characteristic of the present embodiment that, after one photovoltaic power generator unit is connected via a unit group power collection control section 112 at the installation site, a notebook PC 20 serving as a terminal device is connected so as to allow wireless or wired communication not only with the unit group power collection control section 112, but also with the distributed control section 114, with the rest of the components being identical to those of Embodiment 1.

This embodiment makes it possible to individually control the unit group power collection control sections 112 and distributed control sections 114, which facilitates onsite response during repair and maintenance of photovoltaic power generator units 101 exhibiting power generation malfunctions even after starting up the photovoltaic power generation system 100 and makes it possible to achieve higher efficiency in maintenance operations. Moreover, as a result of being able to individually control the distributed control sections 114, the operation of the control system/detector system can be readily checked on a unit-by-unit basis.

The present invention can be reduced to practice in various other forms without departing from its spirit or essential features. For this reason, the above-described exemplary embodiments are to all intents and purposes merely illustrative and should not be construed as limiting. The scope of the present invention is defined by the claims and is not in any way restricted by the descriptions of the specification. Furthermore, all variations and modifications of the claims within the scope of equivalency fall within the scope of the present invention.

It should be noted that this Application claims priority rights from Japanese Patent Application No. 2006-119454 filed on Apr. 24, 2006 in Japan. Its contents are incorporated herein by reference. Moreover, documents cited in this Specification are incorporated in this Application by reference in their entirety.

INDUSTRIAL APPLICABILITY

The present invention is applicable to a photovoltaic power generation system formed by arrangement of multiple photovoltaic power generator units having solar cell modules and a tracking drive section, as well as to a control method for a photovoltaic power generation system.

The invention claimed is:

1. A photovoltaic power generation system control method comprising forming generator unit groups by arranging a plurality of photovoltaic power generator units having solar cell modules and a tracking drive section imparting tracking drive to the solar cell modules, controlling the tracking driver section via a unit group power collection control section collecting the electrical power generated by the generator unit groups, and effecting the power conversion of the generated electrical power collected by the unit group power collection control sections using power converters, the method comprising:
identifying a photovoltaic power generator unit exhibiting power generation malfunction based on a power generation state of each photovoltaic power generator unit and correcting the power generation malfunction of the identified photovoltaic power generator unit via the unit group power collection control section.

2. The photovoltaic power generation system control method according to claim 1, wherein a plurality of generator unit groups and unit group power collection control sections are arranged, a generator unit group exhibiting power generation malfunctions is identified by detecting the power generation state of the plurality of generator unit groups, and the power generation malfunction of the identified generator unit group is corrected.

3. The photovoltaic power generation system control method according to claim 1, wherein at least one of the photovoltaic power generator units situated in the generator unit groups comprises a direct solar radiation meter, a reference electrical power output is computed based on the solar radiation quantity detected by the direct solar radiation meter, a photovoltaic power generator unit exhibiting power generation malfunction is identified by comparing the electrical power generated by the photovoltaic power generator unit with the reference electrical power output, and the power generation malfunction of the identified photovoltaic power generator unit is corrected.

4. The photovoltaic power generation system control method according to claim 2, wherein a system management and control section providing integrated management and control over the plurality of installed generator unit groups and unit group power collection control sections is provided, a unit discrimination signal distinguishing a photovoltaic power generator unit exhibiting power generation malfunction identified based on the power generation states detected by the unit state detection sections is transmitted via the unit group power collection control section to the system management and control section, and the system management and control section corrects the tracking shift of the identified photovoltaic power generator unit via the unit group power collection control section.

5. The photovoltaic power generation system control method according to claim 1,
  wherein the tracking drive section is controlled by controlling the unit group power collection control section using a terminal device capable of controlling the unit group power collection control section via communication.

\* \* \* \* \*